(12) United States Patent
Villella et al.

(10) Patent No.: US 7,653,633 B2
(45) Date of Patent: Jan. 26, 2010

(54) LOG COLLECTION, STRUCTURING AND PROCESSING

(75) Inventors: Phillip Villella, Boulder, CO (US);
Chris Petersen, Boulder, CO (US)

(73) Assignee: LogRhythm, Inc., Boulder, CO (US)

( * ) Notice: Subject to any disclaimer, the term of this patent is extended or adjusted under 35 U.S.C. 154(b) by 0 days.

(21) Appl. No.: 11/559,352

(22) Filed: Nov. 13, 2006

(65) Prior Publication Data
US 2007/0283194 A1 Dec. 6, 2007

Related U.S. Application Data

(60) Provisional application No. 60/735,482, filed on Nov. 12, 2005.

(51) Int. Cl.
*G06F 7/00* (2006.01)
(52) U.S. Cl. .................. 707/10; 707/100; 707/200; 370/386; 370/401
(58) Field of Classification Search ............ 707/100, 707/200, 10; 370/386, 401; 709/228–229, 709/225, 250; 713/168, 201
See application file for complete search history.

(56) References Cited

U.S. PATENT DOCUMENTS

| | | | | | |
|---|---|---|---|---|---|
| 5,857,190 | A * | 1/1999 | Brown | ............... | 707/10 |
| 6,073,255 | A * | 6/2000 | Nouri et al. | ............... | 714/31 |
| 7,152,242 | B2 * | 12/2006 | Douglas | ............... | 705/51 |
| 7,155,514 | B1 * | 12/2006 | Milford | ............... | 709/225 |
| 7,461,044 | B2 * | 12/2008 | Salahshour et al. | ............... | 706/47 |
| 7,548,848 | B1 * | 6/2009 | Deb et al. | ............... | 707/10 |
| 2002/0042846 | A1 * | 4/2002 | Bottan et al. | ............... | 709/249 |
| 2002/0073167 | A1 * | 6/2002 | Powell et al. | ............... | 709/217 |
| 2002/0138762 | A1 * | 9/2002 | Horne | ............... | 713/201 |
| 2002/0165902 | A1 * | 11/2002 | Robb et al. | ............... | 709/202 |
| 2003/0005082 | A1 * | 1/2003 | Shah et al. | ............... | 709/218 |
| 2003/0120663 | A1 * | 6/2003 | Vining et al. | ............... | 707/100 |
| 2003/0212789 | A1 * | 11/2003 | Hamel et al. | ............... | 709/225 |
| 2003/0212899 | A1 * | 11/2003 | Curtis | ............... | 713/200 |
| 2003/0235190 | A1 * | 12/2003 | Josyula et al. | ............... | 370/386 |

(Continued)

OTHER PUBLICATIONS

"Event Log based Dependability Analysis of Windows NT and 2K Systems"—Simache et al.—LAAS-CNRS—Proceedings of the 2002 Pacific Rim International Symposium on Dependable Computing (PRDC 02) 2002-IEEE (pp. 1-5).*

(Continued)

*Primary Examiner*—Jean B Fleurantin
*Assistant Examiner*—Anh Ly
(74) *Attorney, Agent, or Firm*—Marsh Fischmann & Breyfogle LLP

(57) ABSTRACT

The present invention generally relates to log message processing such that events can be detected and alarms can be generated. For example, log messages are generated by a variety of network platforms (e.g., Windows servers, Linux servers, UNIX servers, databases, workstations, etc.). Often, relatively large numbers of logs are generated from these platforms in different formats. A log manager described herein collects such log data using various protocols (e.g., Syslog, SNMP, SMTP, etc.) to determine events. That is, the log manager may communicate with the network platforms using appropriate protocols to collect log messages therefrom. The log manager may then determine events (e.g., unauthorized access, logins, etc.) from the log data and transfer the events to an event manager. The event manager may analyze the events and determine whether alarms should be generated therefrom.

17 Claims, 23 Drawing Sheets

U.S. PATENT DOCUMENTS

| | | | | |
|---|---|---|---|---|
| 2004/0028059 | A1* | 2/2004 | Josyula et al. | 370/396 |
| 2004/0039809 | A1* | 2/2004 | Ranous et al. | 709/223 |
| 2004/0039827 | A1* | 2/2004 | Thomas et al. | 709/228 |
| 2004/0128586 | A1* | 7/2004 | Bahr et al. | 714/43 |
| 2004/0153407 | A1* | 8/2004 | Clubb et al. | 705/41 |
| 2004/0153509 | A1* | 8/2004 | Alcorn et al. | 709/205 |
| 2004/0194114 | A1* | 9/2004 | Spiegel | 719/318 |
| 2004/0254919 | A1* | 12/2004 | Giuseppini | 707/3 |
| 2005/0021701 | A1* | 1/2005 | Seki et al. | 709/223 |
| 2005/0114321 | A1* | 5/2005 | DeStefano et al. | 707/3 |
| 2005/0114508 | A1* | 5/2005 | DeStefano | 709/224 |
| 2005/0114708 | A1* | 5/2005 | DeStefano et al. | 713/201 |
| 2006/0161816 | A1* | 7/2006 | Gula et al. | 714/39 |
| 2006/0184529 | A1* | 8/2006 | Berg et al. | 707/8 |

OTHER PUBLICATIONS

"Learning Knowledge bases for information extraction from multiple text based web sites"—Gao et al.—Intelligent Agent technology, 2003, IAT 2003, IEEE/WIC International Conference on—Oct. 13-16, 2003 (pp. 119-125).*

* cited by examiner

Meta-data Reporting Fields

The following fields are populated for log messages matching a rule.

| Field | Optional | Description | Log Manager | Event Manager |
|---|---|---|---|---|
| MsgClassID (integer) | No | A foreign key reference to the log's classification. | Yes | Yes |
| CommonEventID (integer) | No | A foreign key reference to the log's common event record. | Yes | Yes |
| MPERuleID (integer) | No | A foreign key reference to the MPE Rule that matched the log message. | Yes | Yes |
| Priority (integer) | No | The risk-based priority calculated for the log/event. | Yes | Yes |
| Direction (integer) | No | The direction of the log/event. | Yes | Yes |
| SHostID (integer) | Yes | A foreign key reference to the log/event source host record (if determined). | Yes | Yes |
| DHostID (integer) | Yes | A foreign key reference to the log/event source host record (if determined). | Yes | Yes |
| ServiceID (integer) | Yes | A foreign key reference to the logs applicable service/program (if determined). | Yes | Yes |

Figure 4

Parsed Reporting Fields.

The following report fields contain data parsed from the log message. These fields are populated based on the MPE rule and the data available in the log message. All of these fields are optional.

| Field | Optional | Description | Log Manager | Event Manager |
|---|---|---|---|---|
| SIP (integer) | Yes | Source IP address represented as an 8 byte integer. | Yes | Yes |
| DIP (integer | Yes | Destination IP address represented as an 8 byte integer. | Yes | Yes |
| Sport (integer) | Yes | Source TCP/UDP port number. | Yes | Yes |
| DPort (integer) | Yes | Destination TCP/UDP port number. | Yes | Yes |
| ProtocolID (integer) | Yes | The protocol associated with the log as determined by parsing either the protocol name or IANA number. | Yes | Yes |
| Login (char 50) | Yes | The value parsed for login. | Yes | Yes |
| SName (char 100) | Yes | Value parsed for source host name. | Yes | Yes |
| DName (char 100) | Yes | Value parsed for destination host name. | Yes | Yes |
| Person (char 50) | Yes | Value parsed person field (e.g., joe blow, jane doe). | No | Yes |
| Action (char 50) | Yes | Value parsed for action (e.g., login, logout, reboot) | No | Yes |
| Result (char 50) | Yes | Value parsed for result (e.g., success, failure, error) | No | Yes |
| Program (char 50) | Yes | Value parsed for program (e.g., program name, PID) | No | Yes |
| Object (char 255) | Yes | Value parsed for object (e.g., c:\winnt\cmd.exe) | No | Yes |
| UserField1 (char 50) | Yes | Value parsed for storage in user field 1 | No | Yes |
| UserField2 (char 50) | Yes | Value parsed for storage in user field 2 | No | Yes |
| UserField3 (char 100) | Yes | Value parsed for storage in user field 3 | No | Yes |

Figure 5

| Field | Optional | Description | Log Manager | Event Manager |
|---|---|---|---|---|
| UserField4 (char 255) | Yes | Value parsed for storage in user field 4 | No | Yes |
| UserField5 (char 255) | Yes | Value parsed for storage in user field 5 | No | Yes |

Archive Restoration Wizard

Specify Restore Date
Specify the date range for which logs should be restored.

After: Nov 11, 2006 ▾ 12:00:00 AM   And Before: Nov 11, 2006 ▾ 12:00:00 AM

Select Log Sources
Specify the log sources for which logs should be restored.

Drag a column header here to group by that column.

| Select | Entity | Host | Log Source Type | Log Source Name |
|---|---|---|---|---|
| ☒ | LogRhythm HQ | ATLANTIS | Microsoft Event Log - Application | ATLANTIS MS Application Log |
| ☐ | LogRhythm HQ | ATLANTIS | Microsoft Event Log - Directory Servi... | ATLANTIS MS AD Log |
| ☐ | LogRhythm HQ | ATLANTIS | Microsoft Event Log - DNS | ATLANTIS MS DNS Log |
| ☐ | LogRhythm HQ | ATLANTIS | Microsoft Event Log - File Replication... | ATLANTIS MS FRS Log |
| ☐ | LogRhythm HQ | ATLANTIS | Microsoft Event Log - Security | ATLANTIS MS Security Log |
| ☐ | LogRhythm HQ | ATLANTIS | Microsoft Event Log - System | ATLANTIS MS System Log |
| ☐ | LogRhythm HQ | BORON | Microsoft Event Log - Application | BORON MS Application Log |
| ☐ | LogRhythm HQ | BORON | Microsoft Event Log - Directory Servi... | BORON MS AD Log |
| ☐ | LogRhythm HQ | BORON | Microsoft Event Log - DNS | BORON MS DNS Log |
| ☐ | LogRhythm HQ | BORON | Microsoft Event Log - File Replication... | BORON MS FRS Log |
| ☐ | LogRhythm HQ | BORON | Microsoft Event Log - Security | BORON MS Security Log |
| ☐ | LogRhythm HQ | BORON | Microsoft Event Log - System | BORON MS System Log |
| ☐ | LogRhythm HQ | CONSTANTINE | Microsoft Event Log - Security | CONSTANTINE MS Security Log |
| ☐ | LogRhythm HQ | DELL600SC | Microsoft Event Log - Security | DELL600SC MS Security Log |
| ☐ | LogRhythm HQ | ELVIS | Microsoft Event Log - Application | ELVIS MS Application Log |
| ☐ | LogRhythm HQ | ELVIS | Microsoft Event Log - Security | ELVIS MS Security Log |
| ☐ | LogRhythm HQ | ELVIS | Microsoft Event Log - System | ELVIS MS System Log |
| ☐ | LogRhythm HQ | Expert | Syslog - Autoregistered | Expert |

[Previous]  [Next]                    [Start]  [Cancel]

Alarm List

| Alarm Date | Alarm Rule Name | Events | Priority |
|---|---|---|---|
| 11/11 10:39 AM | Suspicious Host (quick) | 3 | 8.00 |
| 11/11 10:38 AM | Suspicious Host (quick) | 3 | 8.00 |
| 11/11 10:36 AM | Multiple Authentication Failures (quick) | 4 | 8.00 |
| 11/11 10:25 AM | Suspicious Host (quick) | 4 | 8.00 |
| 11/11 10:23 AM | LogRhythm Component Error | 15 | 32.00 |
| 11/11 10:20 AM | Off-Hour Authentication Activity | 4 | 6.00 |
| 11/11 10:18 AM | Production Windows Server Error | 2 | 32.00 |
| 11/11 09:52 AM | LogRhythm Component Error | 30 | 32.00 |
| 11/11 09:52 AM | Suspicious Host (quick) | 82 | 28.00 |
| 11/11 09:48 AM | Production Windows Server Error | 3 | 32.00 |
| 11/11 09:38 AM | Production Windows Server Error | 1 | 32.00 |
| 11/11 09:34 AM | Suspicious Host (quick) | 3 | 8.00 |
| 11/11 09:31 AM | Suspicious Host (quick) | 4 | 8.00 |
| 11/11 09:24 AM | Multiple System Errors | 76 | 32.00 |
| 11/11 09:21 AM | LogRhythm Component Error | 30 | 32.00 |
| 11/11 09:20 AM | Suspicious Host (quick) | 8 | 8.00 |
| 11/11 09:10 AM | Off-Hour Authentication Activity | 8 | 6.00 |
| 11/11 08:52 AM | Multiple System Errors | 9 | 32.00 |
| 11/11 08:52 AM | Production Windows Server Error | 3 | 32.00 |
| 11/11 08:51 AM | LogRhythm Component Error | 29 | 32.00 |
| 11/11 08:51 AM | Suspicious Host (quick) | 72 | 28.00 |

Alarm Properties

| Property | Value |
|---|---|
| Alarm Date | 11/11/06 10:39:03 |
| Alarm Name | Suspicious Host (quick) |
| Alarm Description | |
| Common Events | Dropped Packet |
| Originating Systems | ns1.telemar-ba.net.br (200.223.0.135) |
| Impacted Systems | SonicwallCentral |
| Impacted Applications | |
| Logins | |

LOG COLLECTION, STRUCTURING AND PROCESSING

CROSS REFERENCE TO RELATED APPLICATIONS

This patent application claims priority to, and thus the benefit of an earlier filing date from, U.S. Provisional Patent Application No. 60/735,482 (filed Nov. 12, 2005), the entire contents of which are hereby incorporated within by reference.

FIELD OF THE INVENTION

The present invention relates in general to network monitoring and information management more specifically to an associated structure and methodology that provides for event detection and analysis (e.g., error conditions, audit failures, attacks, intrusions, etc.) based on the processing and organization of log messages.

BACKGROUND

Modern business operations typically require many communication devices and technologies that include routers, firewalls, switches, file servers, ERP applications, etc. Generally, such devices and technologies report their health and status by writing log files. For example, computer processors are responsible for processing vast amounts of data for a variety of applications. To determine how a certain application may be processed by a computer processor, engineers typically design the application with a log file that records various functional outputs within the application. That is, certain functions within the application may output data to the log file so that the engineers may diagnose problems (e.g., software bugs) and/or observe general operational characteristics of the application.

By observing the general operational characteristics of an application, certain valuable information may also be ascertained. For example, log files generated by a file server may record logins. In this regard, certain logins may be unauthorized and their prevention desired. However, with the multitude of communication devices and their corresponding applications available, bewildering array of log data may be generated within a communication network. Additionally, communication networks are often upgraded with additional systems that provide even more logs. Adding to the complexity of the situation, communication devices and applications of these communication networks vary in so many ways and so do their corresponding log file formats. Attempting to comprehensively review log files across so many technologies has generally been impractical.

SUMMARY OF THE INVENTION

The present invention relates in general to text processing in data systems and, in particular, to processing log messages. Log messages are generated by a variety of network platforms including Windows servers, Linux servers, UNIX servers, routers, switches, firewalls, intrusion detection systems, databases, ERP applications, CRM applications, homegrown applications and others. The log data can be collected using standard network logging and messaging protocols, such as Syslog, SNMP, SMTP and other proprietary and non-proprietary protocols. Moreover, the log file may be text based, a proprietary format, a binary format, etc. In addition, the logs may be written to databases such as Oracle, Sybase, MySQL, etc. As a result, a data system may generate a large number of logs in different formats, and it may be desired to monitor or analyze these logs for a variety of purposes.

The present invention provides a system for identifying fields of information within such log messages and for selectively processing the messages in accordance with rules based on those fields. In this manner, log messages can be intelligently processed, in substantially real time, so as to yield useful information. In addition, the invention facilitates automated selective access to archived files and assists in understanding such files, even where those files are old or relate to retired systems. The invention also provides a powerful and flexible text processing engine to facilitate processing of textual messages including log messages. Moreover, the invention provides a protocol for transferring log information between an agent for acquiring log information and a platform for processing of the log information. In one implementation, the agent collects log messages, stamps them with "state" metadata and forwards them to the log processor platform. The protocol enables extremely fast insertion rates while retaining the full content of the original log messages. In this manner, the invention provides for enhanced processing of textual messages including log messages and enables improved audit and compliance analysis, application monitoring, security monitoring, and operations analysis. Moreover, the invention is scalable to support large networks or to adapt to growing networks. The invention also allows for normalization of log information across platforms, technologies and time zones to facilitate centralized processing, data mining and other aggregate processing functionality.

In accordance with one aspect of the present invention, a method and apparatus ("utility") is provided for implementing rules-based processing of log messages. The utility involves: establishing a number of log processing rules for selectively processing the logs based on the content of one or more fields of information; identifying a log message associated with a monitored platform; parsing the log message into a number of data fields and determining field content of at least one of the fields; and, based on the field content, processing the log message using the processing rules. By way of illustration, the rules may govern archiving of log messages or identifying events for further processing. In this regard, the rules may identify a subset of logs for archiving so as to reduce archiving requirements. In the case of event monitoring, logs to be identified as an event may be designated in relation to any of a variety of fields, e.g., relating to critical operating parameters, critical applications and/or users of interest. Information regarding such events may be aggregated and otherwise processed to provide improved system diagnostic or security information. It will be appreciated that events may be defined and prioritized based on criteria defined by specific users.

In accordance with another aspect of the present invention, a utility is provided for improved archiving of log messages. The utility involves identifying a log message to be archived, associating metadata with the identified message to assist in restoring the message, and archiving the log message together with the metadata in a data structure for enabling restoration of the log message using the metadata. For example, the metadata may identify particular fields of the log message relating to the log host, the log message source, an IP address, a program, a login or various other fields. In this manner, these fields can be used to restore logs of interest. Thus, logs related to a particular platform, a particular user or the like can be quickly and easily identified and restored as desired. Moreover, the log files are thus autonomous files. That is, the files are self-describing such that they can exist outside of the inventive system and still be understood months, years, or even decades later based on the metadata associated with the files.

In accordance with a still further aspect of the present invention, a utility is provided for improved transfer of information between an agent and a log processing system. It will be appreciated that the present invention allows for log collection with or without an agent. However, an agent may be desired or required in certain contexts. Where an agent is utilized, the noted utility involves: establishing an agent protocol defining communications between an agent for collecting log messages and a processor for processing log messages; providing an agent for collecting log messages associated with a monitored platform; and operating the agent to identify a log message of interest and associate certain state metadata with the message. The agent is further operative to provide an output in accordance with the agent protocol, where the output includes the entirety, or substantially the entirety, of a content of the message together with the metadata. In this manner, insertion rates can be enhanced while retaining access to the full content of the original log message. From the perspective of the log processing system, the noted utility involves: establishing an agent protocol as noted above; operating the processor to receive a message and identify metadata associated with the log message; and processing the log message based on the metadata.

In accordance with another aspect of the present invention, rules-based processing is performed at the agent (collection point) or at the log manager. That is, rules can be centralized and/or distributed. The rules can be used to process a variety of textual messages, including log messages. The rules processing flows as such:

A raw log enters the processing engines.

The log is analyzed by one or more rules.

The rule(s) examines the text to see if it matches a rules text pattern. This text pattern may be defined using regular expressions or other text processing tools The rule contains tokens that identify specific fields within the text.

Two types of tokens may be employed: sub-rule tokens and normal field tokens.

Normal field tokens are used to parse data from the text of the log into separate reporting fields. This includes fields such as IP address, login, and TCP/UDP port numbers. Users can create and define their own tokens. User defined tokens can be used to extend the systems text log processing so as to allow custom data to be parsed from the text and stored in separate "normalized" fields for reporting.

Sub-rule tokens parse data from the text that will be further analyzed for further differentiating the text log from other logs. For example, a system may report logs that have the exact same format and only differ by an error code. Sub-rule tokens would parse the error code where the parsed error code value would be used to differentiate one log from another.

Rules that have sub-tokens are further processed. This additional processing can include applying an additional pattern matching logic to the text and/or examining the values of sub-rule token parsed data.

A rule can include a theoretical infinite number of iterations where the rule matches a text pattern, parses sub-rule tokens, processes sub-rule token value against text pattern, parses sub-rule tokens, and processes sub-rule token values until the log text is fully differentiated/processed.

The rules can also prioritize when a token should be used. This is the case when a value could appear in multiple positions in the text and you want the engine to look at position 1 first, then position 2, then position 3, etc.

The present invention is also useful in normalizing Windows event log information, such as time stamps associated with such event logs. In this manner, such time stamp information can be provided in a manner that is platform independent, for example, so as to facilitate remote collection of Windows event logs and collection of such logs across multiple platforms, e.g., for system wide monitoring and aggregation purposes. In accordance with a further aspect of the present invention, a utility is provided in this regard that involves: accessing a Windows event log from a monitored platform; identifying a time stamp associated with the Windows event log; and normalizing the time stamp such that the time stamp is substantially independent of a processing environment of the monitored platform. For example, the time stamp may be normalized by accounting for one or more of the local time zones, a local clock offset, and a local platform time system.

In accordance with a still further aspect of the present invention, a utility is provided for collecting Windows event logs. The relevant log collection functionality can be implemented by a collection agent that may be resident at the location of the monitored platform or may be remotely located. The utility involves providing a log manager for processing log information from one or more monitored platforms; operating the log manager to remotely access a Windows event log from a monitored platform; and processing the time stamp so that the time stamp is substantially independent of a processing environment of the monitored platform. It will be appreciated that the log manager may be operated to collect Windows event logs from multiple platforms where the time stamps from the multiple platforms are related to a common time reference. In one implementation, prior to each query for event log data, the log manager collects the system time from the Windows machine. This time is used to make corrections for clock offsets between the monitored system, or an agent collecting the event log data, and the log manager or another Windows system, which may be remotely located. In this manner, the event log times collected from the remote platforms are corrected to a master time so as to define a common time reference. In accordance with a still further aspect of the present invention, event log message strings are stored, for example, in cache. One of the features of event log data is that the log message text is collected from the remote system. Each event log entry contains a message string with placeholders for what are called replacement strings. In order to put the full message together, the replacement strings are substituted into the message string for the placeholders.

EXAMPLE message string=user %1 logged into %2
replacement strings:
%1=John_Doe
%2=John_Doe_Workstations
Full message=User John_Doe logged into John_Doe_Workstations One thing that can make remote event log collection slow and expensive from a network bandwidth standpoint is continually collecting the message strings. These strings (with the placeholders) do not change unless the library from which they are taken is replaced or updated. Since these strings generally are not cached locally, the system of the present invention caches a local copy (at the agent) for a pre-determined amount of time. When the agent looks for the message string, it first looks to see if it is in the cache. If the string is in the cache, it uses the local copy; if not, it retrieves it from the remote system and puts it in the cache. The cache lifetime can be configured to balance efficiency vs. obtaining the most recent version of the message string (i.e., user installs new version of a library).

The present invention also provides for improved scalability of a log management system. For example, the scalability of an individual log manager may be determined by the server platform, the aggregate numbers of log messages forwarded per second, and the number of connected log agents. Generally, the number of deployed log managers is the only limitation on the total scalability of the log management layer. The process of adding more log storage is readily accomplished by the addition of a log manager. The log managers work in parallel to meet the total log management needs of the organization.

BRIEF DESCRIPTION OF THE DRAWINGS

FIGS. 4 and 5 are tables of reporting fields used by the Message Processing Engine ("MPE") of a log manager.

FIG. 11 is a screen capture of an application interface used to customize rules for the MPE.

FIG. 12 is a screen capture of an application interface used to customize sub-rules for the MPE.

FIG. 14 illustrates an exemplary archive file control interface.

FIGS. 18 through 19 illustrate other dashboard interfaces that may provide additional information relating to event collection by an event manager.

FIG. 21 illustrates a rule manager interface.

DETAILED DESCRIPTION OF THE DRAWINGS

The present invention relates to network monitoring and information management through the processing of log messages. In the following description, the invention is set forth in the context of log messages that are generated by computers within a computer network, for purposes of illustration. However, it will be appreciated that the invention is applicable to a broader variety of applications. For example, the log message processing may provide for the detection of a particular event for virtually any type of system that generates log messages (e.g., computer servers, mainframes, network devices, security devices, access control devices, etc.). In addition, certain aspects of the invention are applicable in contexts other than log processing.

Figure 1:
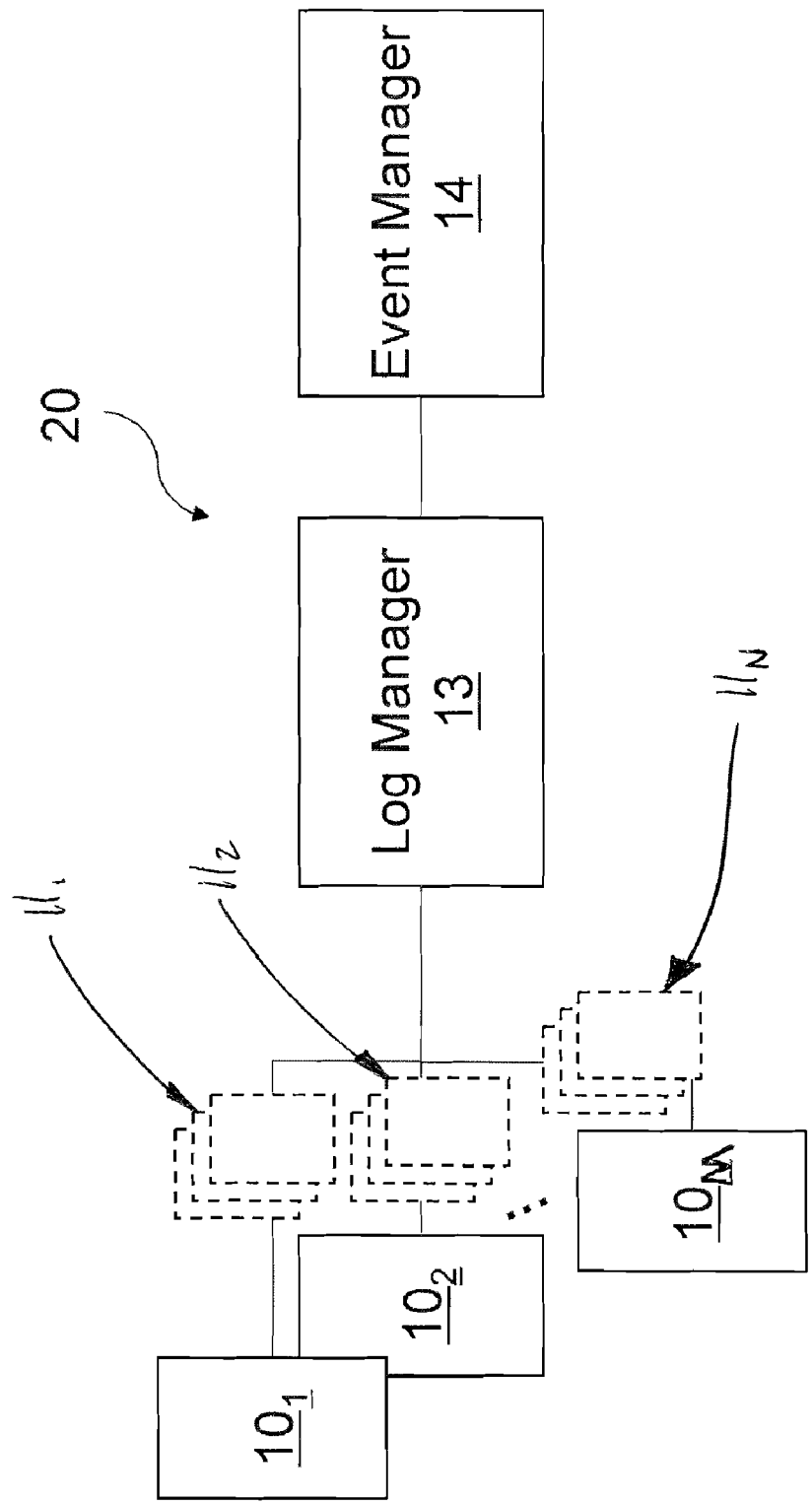
FIG. 1 is a block diagram of a system that provides for log management and events associated therewith.

Generally, the invention regards systems and methods that provide for the collection, processing, management, and analysis of the log messages. In FIG. 1, log messages are generally identified by the reference numbers $11_1 \ldots 11_N$ and are generated by their respective computers $10_1 \ldots 10_M$ (where M and N are both integers greater than 1). In this regard, the computers $11_1 \ldots 10_M$ may each generate a plurality of text files describing various events associated with the computers' operations. The generated text files are also routinely updated by the computers $10_1 \ldots 10_M$ as various events transpire during the computers' operations, a process that is generally referred to as "logging". Additionally, while log messages may come in other formats, text files are often used for logging because of their readily manageable format and because a person can more easily understand the information contained therein for diagnostic purposes when problems arise.

Generally, the computers $10_1 \ldots 10_M$ that generate logs $11_1 \ldots 11_N$ come in a variety of configurations with each being capable of generating tremendous numbers of logs. For example, the computer $10_1$ may represent a server operable within a computer network configuration. In this regard, the server may be responsible for delivering applications to computers within the computer network, administering communications among computers within the computer network, controlling various features of the computer network etc. In the process of performing these functions, although partially dependent upon the number of computers within the network, the server typically generates thousands of log entries per day. To illustrate, when a user incorrectly attempts to logon to a single computer on the computer network, the server may generate a log entry noting at a particular time (e.g., timestamp) that an improper procedure was performed. Of course, the invention is not intended to be limited to log entries that merely reflect improper login attempts. Rather, computers regularly generate log entries for a variety of actions, such as application launch failures, audit activity, attacks, operating system errors, etc. Other examples of computers may include individual computers (e.g., desktops and notebooks/laptops), computer workstations, mainframe systems, etc.

The system 20 of the present invention provides for the rapid/automated extraction of viable information from the logs $11_1 \ldots 11_N$. Namely, the system 20 provides for a log manager 13 that is communicatively coupled to the various computers $10_1 \ldots 10_M$ to receive the logs $11_1 \ldots 11_N$ generated therefrom (e.g., collection). In this regard, the log manager 13 may use various protocols to communicate with the computer $10_1 \ldots 10_M$. For example, the system 20 may employ log agents (e.g., software) that operate on the individual computers $10_1 \ldots 10_M$ to extract log entries from the logs of the computers. In some instances, the log agents are software protocols that are innate to the operating system of a particular computer. For example, the log manager 13 may be communicatively coupled to a computer using the Windows Operating System by Microsoft, Inc. and, as such, may communicate with the computer using Windows Networking/

Figure 2:
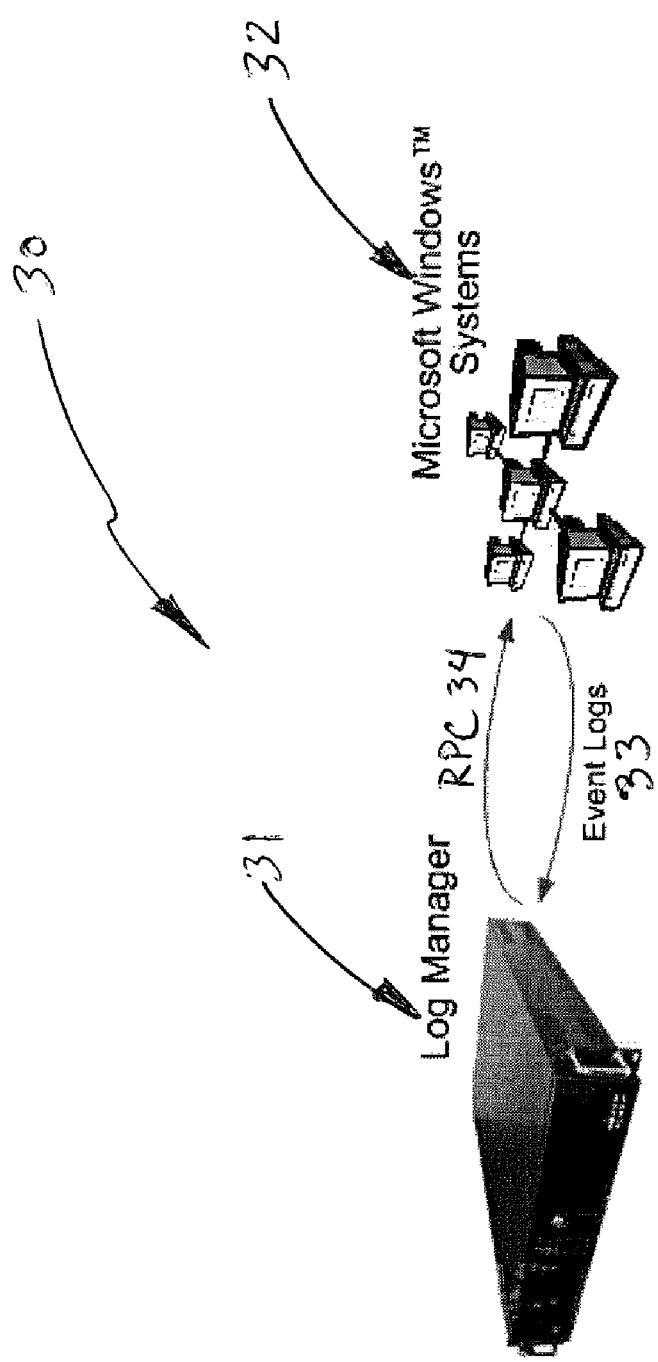
FIG. 2 is a block diagram of a log manager operable with a computer network employing Microsoft Windows operating systems.

Remote Procedure Calls (RPC). Such is illustrated in the system 20 of FIG. 2 with the log manager 31 communicating with a computer network 32 that runs Microsoft Windows operating systems. The log manager 31 may use the RPCs 34 to extract various log entries 33 generated by the various computers of the computer network 32 for processing by the log manager. In other instances, a software log agent may be configured to operate on the computer to exclusively communicate with the log manager 13. In such an embodiment, the log agent may transfer log entries to the log manager 13 via proprietary protocols. This and other examples of log manager communications are illustrated in greater detail below in FIGS. 3 through 5.

The information that the log manager 13 may extract from the logs may ultimately be used to generate alarm messages that may be useful to an end user. For example, the log manager 13 may process thousands of log messages and detect certain events from the volume of data contained therein. The log manager 13 may aggregate log data into a manageable format that summarizes, for example, the frequency of a particular event. Additionally, the log manager 13 may archive the above data for future reporting uses. This aggregation and archival may generally be referred to as management.

To illustrate some of the management aspects of the log manager 13, a computer in a network (e.g., computer $10_1$) may log an entry that a particular Internet Protocol (IP) address is attempting access to the computer. Similarly, another computer (e.g., computer $10_2$) in the network may log an entry that the same IP address is attempting access to the computer. The log manager 13 surmises that the same events are occurring on different computers. The log manager 13 may, in turn, generate an event message stating that the IP address is attempting access on various computers of the network. In this regard, the system 20 is generally configured with the event manager 14 to process the event messages to determine whether an alarm should be generated (e.g., analysis). If the IP address of this example is that of a computer that routinely communicates to the computer network as part of an authorized process, the event may simply be registered by the event manager for future use, if any. However, if the IP address belongs to a computer system that is, for example, attempting to bombard the network with message traffic, the event manager 14 may generate an alarm that a denial of service attack is underway so that a system administrator may take appropriate steps to limit or prevent any damage. Additionally, the utility may detect trends of events and/or alarm generation and provide reports pertaining to those trends, also falling generally under the purview of analysis.

Figure 3:
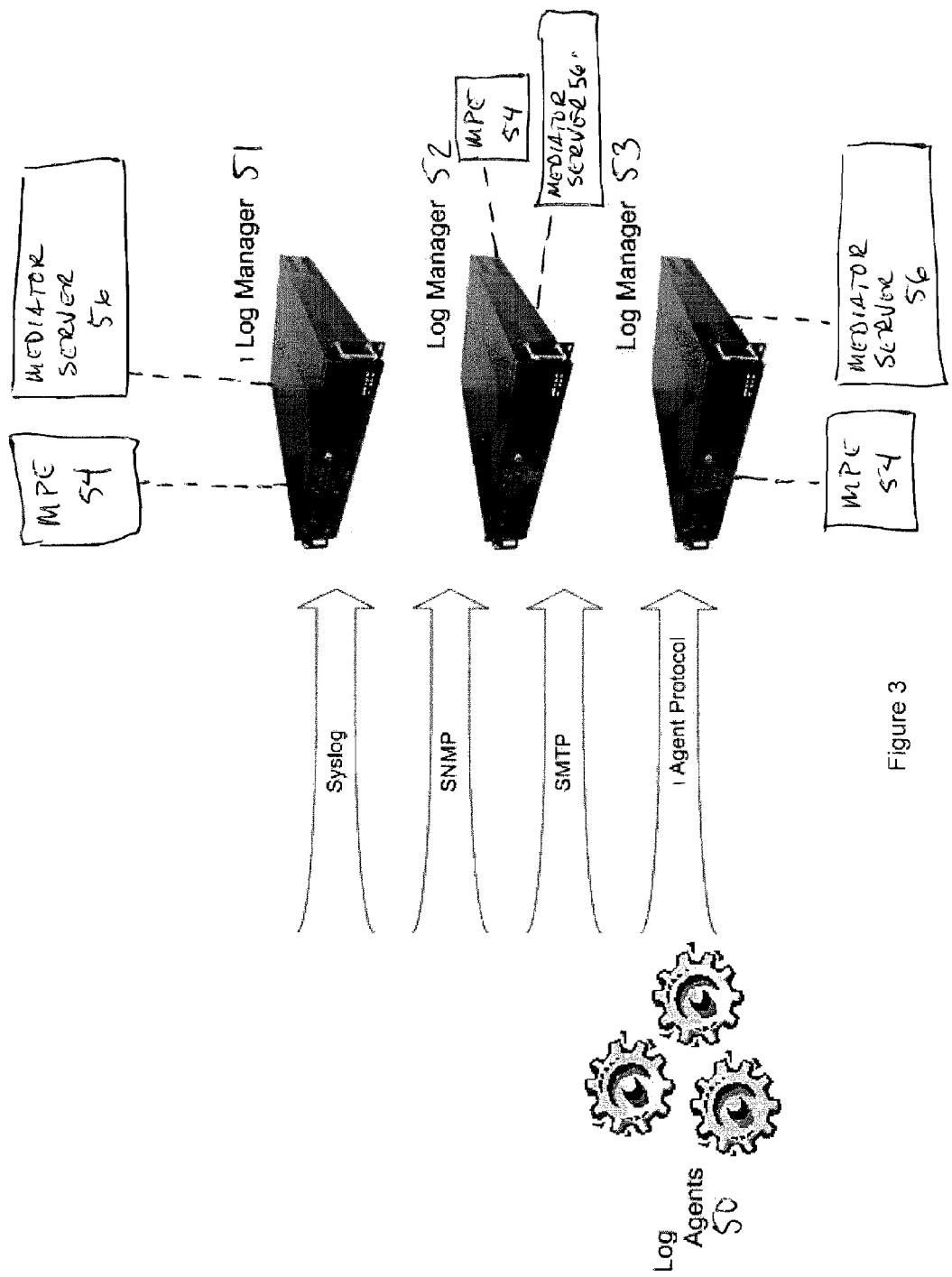
FIG. 3 is a block diagram of multiple log managers with each being configured to communicate to a computer network in a variety of manners.

Turning now to a more specific example, FIG. 3 shows a block diagram of the log managers 51-53 with each being configured to communicate with a computer system (e.g., a computer network, a single computer, a work station, a server, a mainframe, routers, switches, network devices, firewalls, etc.) and thereby operate as a front end to an event manager (e.g., event manager 14 of FIG. 1). For example, the log manager 51 may be configured to communicate with a UNIX-based computer system. In this regard, the log manager 51 may use syslog protocols that are inherent to the UNIX operating system to receive log messages from the computer system. The log manager 52, on the other hand, may be configured to exclusively operate using SNMP (Simple Network Management Protocol) and SMTP (Simple Mail Transfer Protocol) to receive log messages via the Internet or computers using Internet protocols. Those skilled in the art readily recognize SNMP as a means to monitor and control network devices, and to manage configurations, statistics collection, performance, and security and SMTP as a network management protocol used almost exclusively in TCP/IP networks to send and receive electronic mail.

Another example of transfer protocols that may be used are the Netflow protocols produced by Cisco Systems Inc. For example, the log manager can be configured to monitor a specified UDP ("User Data Protocol") port for incoming Netflow data. In this regard, the Netflow data may be received as UDP packets containing one or more flows collected by the sending device. A set of processing rules may be assigned to a Netflow policy such that Netflow data may be tagged as originating from a Netflow Log Message Source. Additionally, Netflow may be used within virtual source handling process (described below) in order to assign the Netflow data from different devices to specific log message sources (e.g., within system 20 of FIG. 1).

In one embodiment, the log managers are configured with a server process, called a message processing engine ("MPE"), that is responsible for processing each log message against a rule base. For example, log manager 53 is illustrated as being configured with the software component MPE 54 that provides for the identification of specific log messages, the parsing of data from the log message to reporting fields (e.g., IP addresses, logins), log message "aging" (e.g., deletion periods) and archiving, and the forwarding of a subset of log messages to an event manager (e.g., event manager 14 above). Because log messages vary in format and the data they contain, a flexible and powerful text comparison capability is employed. The text comparison is generally implemented using regular expressions, similar to those used in the UNIX operating system environment. The regular expressions assist in identifying and parsing log messages.

In this regard, the MPE 54 may also be configured with rules to implement such processing. For example, the MPE 54 may use a set of rules that are a combination of Microsoft .NETs regular expression syntax (modeled after industry standard regular expression syntax) and a unique tagging notation. The tagging notation additionally identifies sections of the log message that should be parsed into report fields, such as source IP addresses, destination IP address, and Login information. When an MPE rule is prepared (e.g., via the exemplary interfaces of FIGS. 11 and 12 described below), the tagging notation is converted to regular expression notation such that the MPE 54 can process log messages by comparing them to applicable rules (per a policy). More specifically, when a log entry matches a particular rule, the following is generally performed:

1. The log message direction is determined (e.g., external, internal);
2. A risk-based priority is calculated;
3. Meta-data is parsed from the log message text
4. The original log message text, the parsed meta-data, and any prepared data (e.g., direction, risk-based priority, time-to-live, archive settings) is written to the Log Manager database; and
5. An event is generated and forwarded to the event manager (e.g., if the feature is activated).

The event record that is generated by the MPE 54 generally contains the same information as the updated log message record with additional reporting fields. Examples of those reporting fields are shown and described in FIGS. 4 and 5. These reporting fields (i.e., of FIGS. 4 and 5) are updated by the MPE 54. The reporting fields may include meta-data associated with log messages and data that is parsed from the log.

In yet another example of possible communications between the log manager and a computer system, log manager 53 is configured to communicate with a computer system via log agent protocols that operate with the computer system being monitored. For example, a software application (i.e., log agent 50) may be configured to specifically operate within a particular computing environment (e.g., an operating system). The log agent 50, when executed by the computing environment, may retrieve generated log messages from the computing environment and transfer those messages to a log manager, such as log manager 53. Such is generally referred to as an "agent-based" configuration. In one embodiment, the log agent 50 collects log data from various sources and forwards the data to a log manager (e.g., log manger 53) via authenticated TCP or other transport protocol. Additionally, the log agent 50 may encrypt log data from the log messages of its respective computer system and then configure the encrypted log data within the transport protocol that allows for the encrypted log data to be transferred from the computer system to the log manager 53. For example, the log agent 50 may be configured to encrypt the log entries before transfer to the log manager 53 to provide reporting assurance, as described hereinbelow. The log manager 53, upon receiving encrypted logs, may decrypt the logs and begin processing them to extract useful information. Examples of the encryption technology used by the log agent 50 may include, but are not limited to, the Blowfish encryption algorithm or the Advanced Encryption Standard ("AES"). The log agent may additionally compress log messages before being sent over the network.

The log agent may monitor and forward textual log data of a variety of sources, such as firewall logs, web proxies, intrusion detection alarms, audit logs or system logs. When log data is not textual in nature, specific log collection adapters may be configured (e.g., as in the case of a Windows Event Log). The log agent can also be configured to forward logs to one or more backup log managers when a primary log manager is unavailable. This ability to "failover" to a backup log manager helps assure reliable delivery of log data.

Additionally, the log agent 50 may be configured to communicate with the log manager 53 and observe the log messages that are being received by the log manager. To illustrate, log manager 51 is shown with the application interface 55 software module that enables communications between the log manager 51 and a computer coupled thereto. The log agent 50 may be configured to observe items such as the number of Netflow packets in a disk buffer (e.g., the number of Netflow packets that have been spooled to disk), the number of Netflow packets in an unprocessed queue (e.g., indicating the number of Netflow packets that are awaiting processing), the number of Netflow packets received (e.g., indicating the number of Netflow packets that have been received by the agent since it last started), the number of Netflow packets received per second.

Generally, the Netflow server is governed through four (4) configuration parameters in the configuration file of the log agent 50. The configuration parameters include the Netflow_server (e.g., used to enable or disable the Netflow server), Netflow_server_nic (e.g., used to specify the interface to receive Netflow data, determine a network interface card to use), Netflow_server_port (e.g., used to specify a port on which the Netflow server will receive Netflow packets), and Netflow_server_crypto (e.g., used to specify whether the Netflow message source will encrypt data).

Although described with each log manager being configured to operate/communicate with a single protocol, this description is merely intended to make the reader more readily familiar with the manner in which the log managers operate. Alternatively, log managers 51 through 53 may each be configured to operate/communicate with a variety of computer systems to collect and process log messages such that events may be generated by the event manager. For example, each log manager may be configured to communicate via a variety of protocols (e.g., syslog, SNMP, SMTP, RPC, log agent 50 protocols, etc.) such that the log manager can be flexibly configured to communicate with a number of computer systems. Additionally, while FIG. 3 illustrates log managers 51-53, the invention is not intended to be limited to the number of illustrated log managers. Rather, the illustrated embodiment is merely intended to assist the reader in the communication protocols between the log managers and various computer systems/log agents. Those skilled in the art should readily recognize that other embodiments may call for fewer or more log managers as a matter of design choice. For example, the number of log managers may be scaled based on a variety of factors such as the aggregate numbers of log messages forwarded per second and the number of connected log agents. Also, process of providing additional log storage may be accomplished through the addition of log managers operating in parallel.

Figure 6:
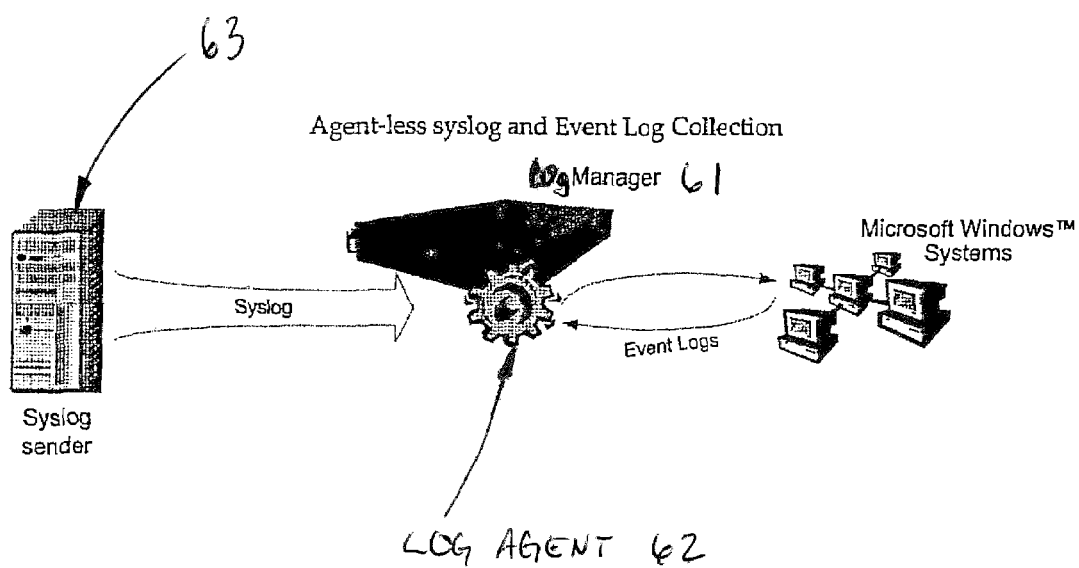
FIG. 6 is a block diagram of an agentless log manager configuration.

While log agents may reside on the computer hosting the logs of interest, certain scenarios exist in which the log agent can collect log data from remote systems. For example, log agents may be configured as agent-less. In such a configuration, a log agent 62 may be installed as a "log aggregation server", as shown in FIG. 6. This configuration may even be within the log manager itself (i.e., log manager 61. In this regard, the log agent 62 may serve as a central log data collector that forwards collected logs to a log manager. For example, a log agent may have a built in syslog server that can accept log data from a device 63 sending syslog data for forwarding directly to a log manager. Such a capability may provide flexible support for collecting logs from devices and hosts that use the syslog protocol, such as routers, switches, and Unix servers.

Figure 7:
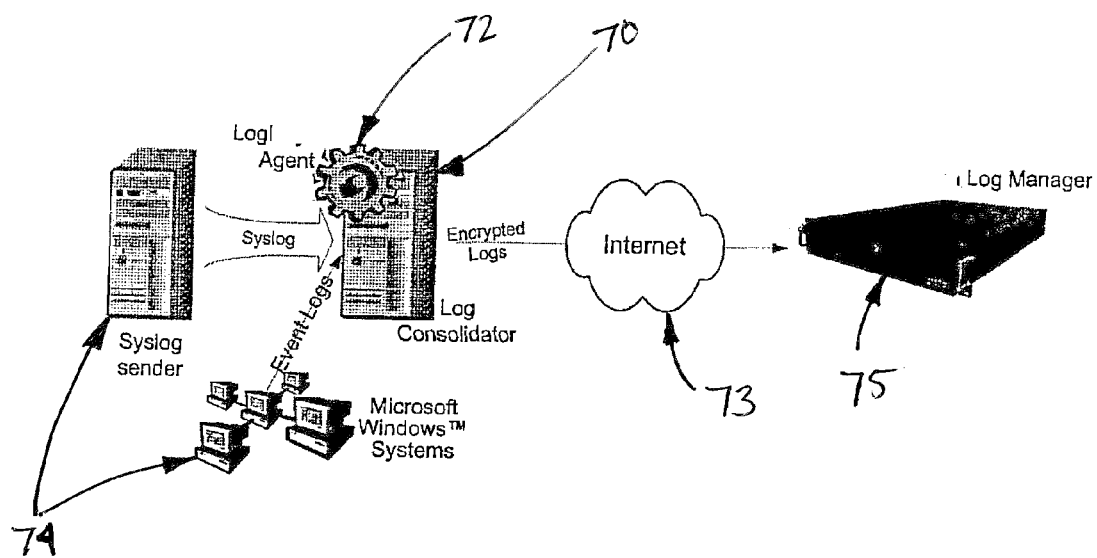
FIG. 7 is a block diagram of a remote log agent configuration.

Additionally, by using native Windows protocols, the log agent can connect to and collect event logs from remote systems, as shown in FIG. 7. For example, the log agent 72 may be installed on a system 70 and configured to collect, consolidate, and forward the event logs of remote systems 74 over the Internet 73. In this regard, the log agent 72 can support the forwarding of event logs of Windows based servers without requiring an agent on each server. For example, many businesses have information technology ("IT") devices and servers deployed at remote sites where administration and monitoring is done centrally. A major challenge in managing remote sites is the ability to effectively monitor security and availability of those sites because the sites typically have no IT support present. A single log agent can be configured to run as a syslog server and a remote Windows event log consolidator with installation of such on a single server at the remote site. In this regard, the log agent may collect logs from communicatively coupled network devices (e.g., routers and firewalls via a syslog server) and/or Windows servers. The log agent can then forward the logs across the internet 73 via encrypted and authenticated TCP communication protocol. The logs may then be securely forwarded to a log manager 75 through firewalls. Once the logs are collected by the log manager 75, the logs can be transformed into events for central monitoring alarm generation when applicable.

Regarding consolidation, the log agent 72 may consolidate log messages by counting the number of times a unique log message is collected and/or observed within a certain timeframe. For example, the log agent 72 may retrieve/receive log messages and observed various portions of metadata associated with those files. The log agent 72 may then consolidate a plurality of log messages into one message to the log manager indicating that the same log message has been observed for a certain number of times or at some frequency. In one embodiment, the log manager may include an application programming interface ("API") that allows a user to aggregate reports based on predetermined criteria. In this regard, the user may program the log agent 72 via the API to retrieve of log messages according to a metadata set as selected by the user.

Figure 8:
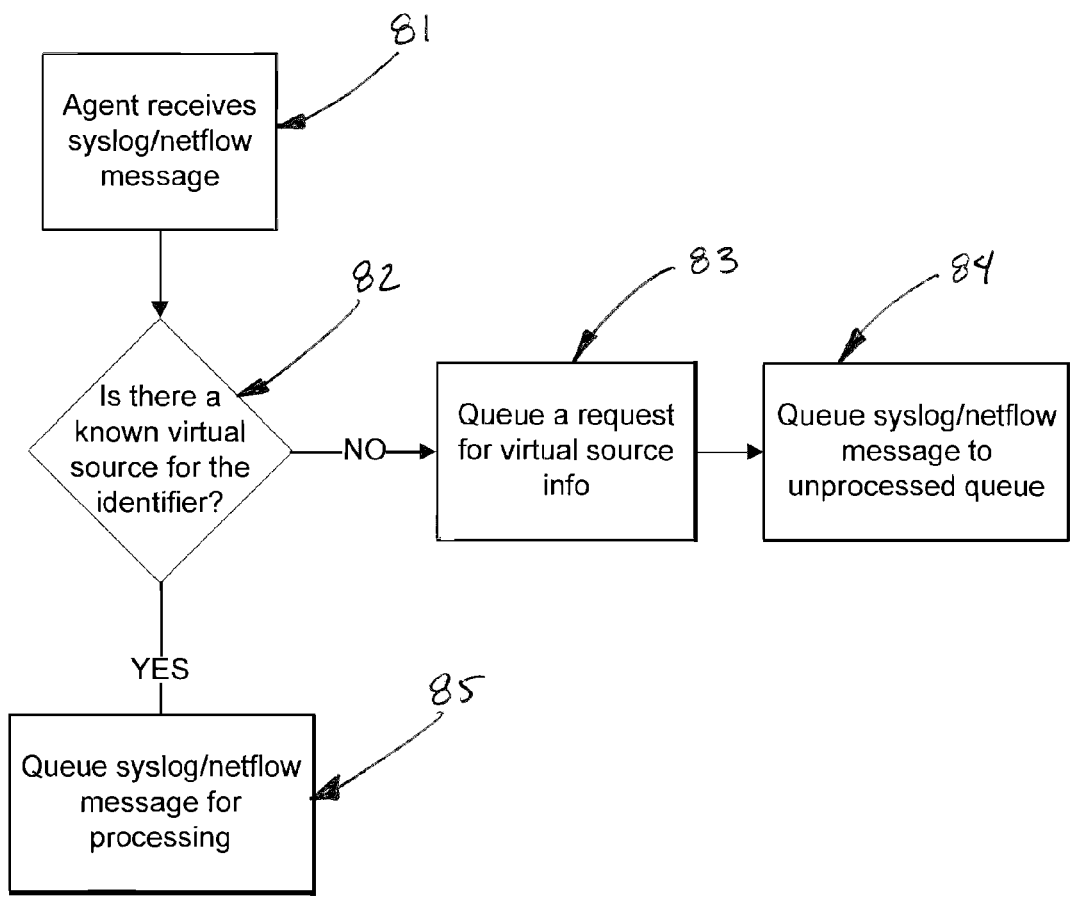
FIGS. 8 and 9 are flowcharts of exemplary log agent processes.
Figure 9:
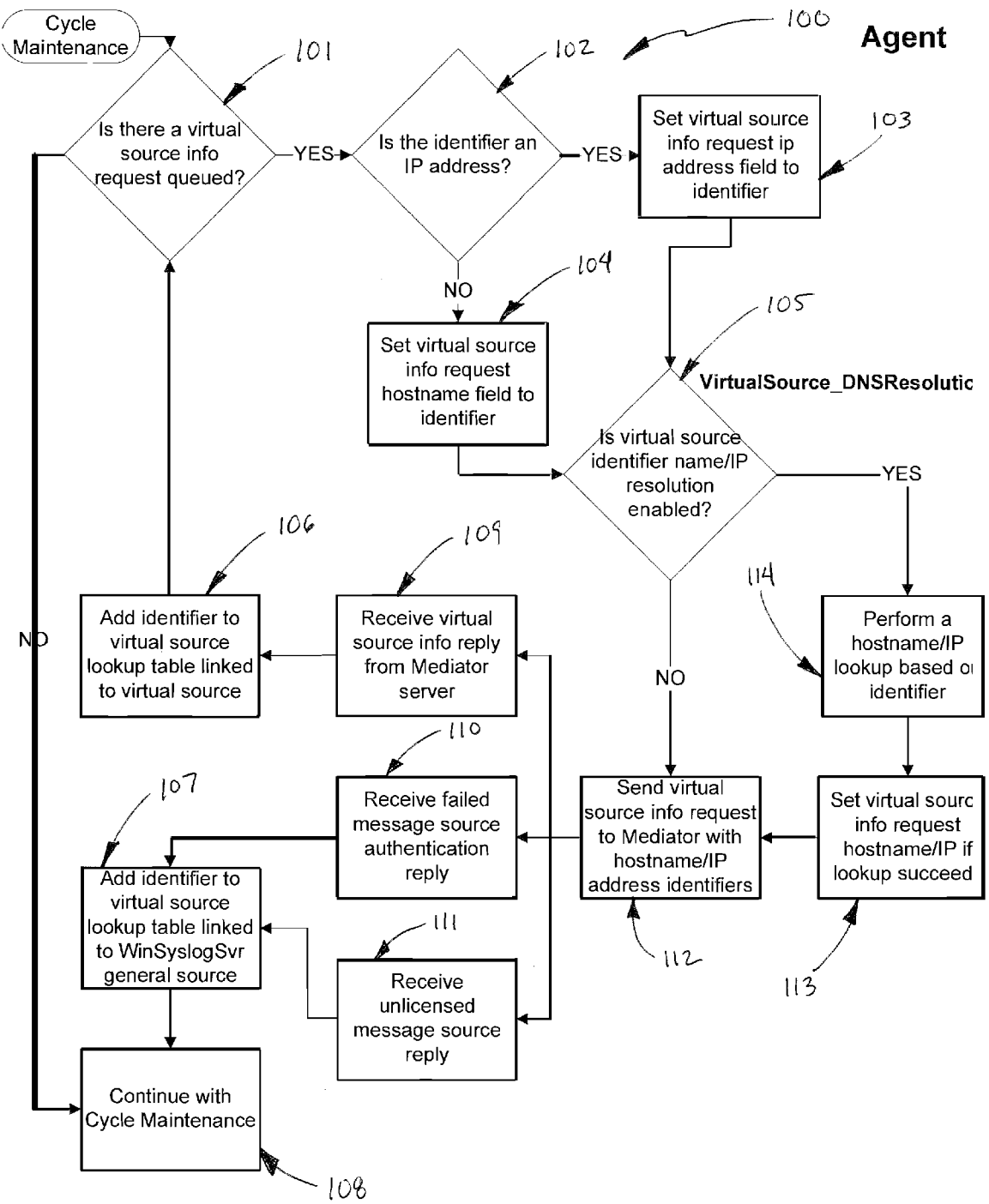

FIGS. 8 and 9 are flowcharts of exemplary log agent processes that provide for virtual source handling. Virtual source handling is the process of associating log messages, based on values contained in the log message, to a logical container that represents the source of the log data. In flowchart 80, a log agent (e.g., log agent 50 of FIG. 3) receives a syslog/Netflow message in process element 81. The log agent then determines whether there is a known virtual source for the identifier, in process element 82. For example, the log agent may query a log manager for virtual log message source information. When the log agent receives syslog or Netflow data, an identifier may be parsed out of the log. This identifier is frequently an IP address (but can also be a hostname, application name, or other unique descriptive value) which can be used to map log data to a specific virtual source. If there is no known virtual source for the identifier, the log agent may queue a request for the virtual source information to the log manager, in process element 83. Subsequently, the log agent may queue the syslog/Netflow message to an unprocessed queue, in process element 84. If there is a known virtual source for the identifier, then the log agent assigns the virtual source to the the syslog/Netflow message for processing by the log manager, in process element 85.

Flowchart 100 of FIG. 9 illustrates the process of the log agent/log manager interaction when a virtual source information request is queued (i.e., process element 101), generally referred to as a mediator server maintenance process. Such is illustrated with the following syslog data:

Jul 16 16:53:49 192.168.1.20 dhclient: DHCPRE-
QUEST on eth0 to 192.168.1.10 port 67

If the log agent parses out an IP address identifier (i.e., process element 102), the log agent may perform a forward DNS lookup in an attempt to gather a fully qualified domain name for the IP address. Such may be performed by setting the virtual source information request IP address field to the identifier, in process element 103. Conversely, if the log agent parses out a hostname or fully qualified domain name (e.g., process element 102) it may perform a reverse DNS lookup in an attempt to gather an IP address. Generally, this results in setting the virtual source info request hostname field to the identifier, in process element 104. The DNS lookups can be enabled/disabled via a VirtualSource_DNSResolution configuration parameter in the log agent's configuration file, in process element 105. The VirtualSource_DNSResolution, when enabled, may cause the log agent to attempt to resolve hostnames for syslog sending devices that send IP addresses as the identifier. This configuration parameter may also cause a log agent to attempt to resolve IP addresses for syslog sending devices that send hostnames as the identifier. Additionally, this configuration parameter may cause the log agent to perform forward and reverse DNS lookups on identifiers parsed from syslog and Netflow data. Thus, if the DNS lookups are enabled, the log agent may perform a hostname/IP lookup based on the identifier, in process element 114, and set the virtual source info request hostname/IP if the DNS lookup is successful, in process element 113.

Figure 10:
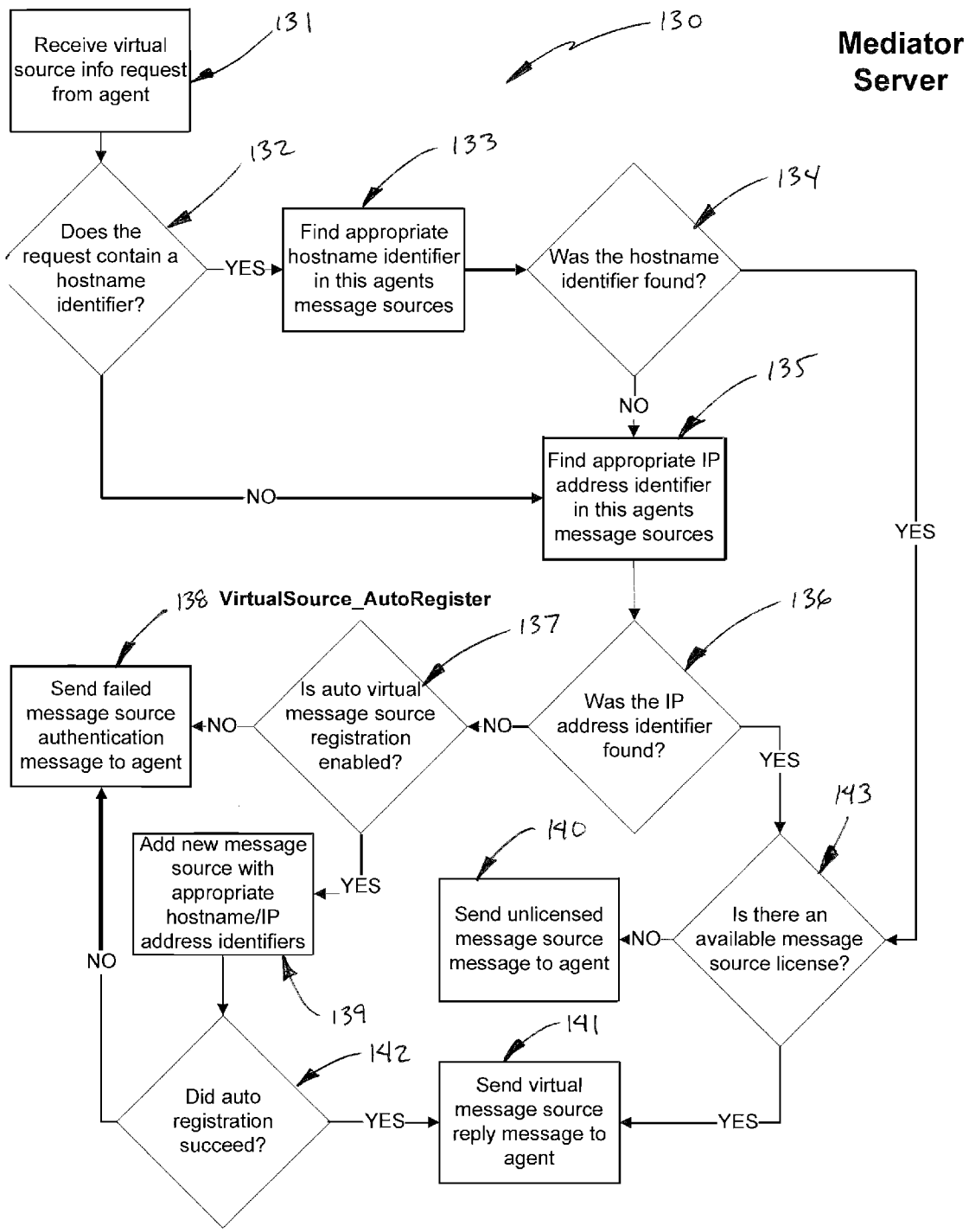
FIG. 10 is a flowchart of an exemplary agent and mediator server process for automatically recognizing hosts sending log data to a log manager (e.g., "auto-registration").

The log agent may subsequently send a virtual source information request to a mediator server within the log manager (described in greater detail below in FIGS. 10 through 12) containing the identifier parsed out of the log along with any information gathered through the DNS queries, in process element 112. Such may also occur if the virtual source identifier name/IP resolution is disabled (e.g., process element 105). When the mediator server receives a virtual source information request from a log agent, the mediator server examines virtual sources loaded from a configuration database (e.g., a configuration database of system 20) to see if the identifier is assigned to a virtual source. If the identifier is assigned to a virtual source, then the mediator server may return a virtual source information reply containing an appropriate log message source information to the log agent, in process element 109. The log agent may then assign all syslog or Netflow data from the identifier to the virtual source. That is, the log agent may add the identifier to a virtual source lookup table that is linked to the virtual source, in process element 106. From there, flowchart 100 may cycle to determine whether there is a virtual source info request being queued, in process element 101.

If, however, the identifier is not assigned to a virtual source (and the mediator server is configured to auto register virtual sources), then the mediator server may create a new virtual message source for the agent that sent the virtual source information request. The newly created virtual source generally has the identifier automatically assigned to it. Newly created syslog sources are generally created with the log message source type of Syslog-Autoregistered. Newly created Netflow sources, on the other hand, are generally are created with the log message source type of Cisco Netflow.

Additionally, if the identifier is not assigned to a virtual source and the mediator server is not configured to auto register virtual sources, the mediator server may return a failed message source authentication message to the log agent, in process element 110. In the event that the log agent receives a failed message source authentication message from the Mediator Server or the virtual source information request fails (e.g. the virtual source does not exist and the Mediator Server is configured to not auto register virtual sources) the log agent may assign syslog/Netflow data from the identifier in question to the generic WinSyslogSvr/WinNetflowSvr source, in process element 107. Similarly, if the log agent receives an unlicensed message source reply from the mediator server, in process element 111, the log agent may assign syslog/Netflow data from the identifier in question to the generic WinSyslogSvr/WinNetflowSvr source, in process element 107. In either case, flowchart 100 may continue with cycle maintenance in process element 108 by returning to process element 101.

As mentioned, the log agent may send a virtual source information request to a mediator server within the log manager for log message processing. The mediator server process, however, is not the end of processing by the log managers. Generally, log managers, such as log managers 51-53 of FIG. 3, have at least three components, a relational database management system, a mediator server, and a message processing engine. The relational database management system ("RDBMS"), such as Microsoft SQL Server, stores log data. The RDBMS generally provides full backup and recovery facilities and ensures transactional integrity.

The mediator server (generally operable within a Windows OS environment) handles connections from log agents, inserts forwarded log data into the database, and handles the archiving or destruction of log data according to a user configurable policy. The mediator server process is responsible for managing interactions and communications with log agents and is illustrated in flowchart 130 of FIG. 10.

The mediator server process initiates when a virtual source information request is received from a log agent, in process element 131. That is, a log agent may initiate a virtual source information request to which the mediator server responds by satisfying the requests. In doing so, the mediator server may determine whether a request contains a hostname identifier, in process element 132. If so, the mediator server finds the appropriate hostname identifier associated with that particular log agent's message sources, in process element 137. For example, a log agent may operate with a plurality of devices such as that described in the remote agent-less log management system described herein above. Accordingly, the log agent may receive log messages from a variety of different devices, each of which may have a hostname identifier. The mediator server may look up the hostname identifier is associated with that log agent (i.e., process element 134). If a hostname identifier is found, the mediator server may determine if there is an available message source license, in process element 143. For example, a log manager may have a license that is used in determining the maximum number of log sources that can send log data to the log manager simultaneously. In this regard, the log manager may check for an available license to determine whether a maximum log source limit has been reached. In one embodiment, each log source may be individually licensed. The mediator server may determine whether log messages from a particular device are authorized, or licensed. The mediator server may then obtain the license of the particular device to begin processing of log messages. If not, the mediator server may find the appropriate IP address identifier of the log agent's message sources, in process element 135. Such may also be performed if the original request does not contain a hostname identifier, in process only 132.

Upon searching for the IP address identifier in the log agent's message sources, the mediator server may determine whether the IP address identifier was found, in process element 136. If so, the mediator server may determine whether there is an available message source license, in process element 143. If there is no IP address identifier found, the mediator server may determine whether auto virtual message source registration is enabled, in process element 137. For example, when the VirtualSource_AutoRegister is enabled, the mediator server may automatically register new virtual sources for unknown syslog/Netflow sending devices, in a manner similar to plug-and-play registration of devices with computers. Such is generally performed upon receiving syslog or Netflow data with an identifier not already assigned to a virtual source. This may create a message source in the event manager database for the syslog/Netflow sending device. Virtual sources can also be created manually via a log agent. Virtual sources are generally created and managed in the same way as other log message sources so long as they are created within the agent that is running the syslog or Netflow server.

If the auto virtual message source registration is not enabled, the mediator server may send a failed message source authentication message to the log agent and communication therewith, in process element 138. If, however the auto virtual message source registration is enabled, the mediator server may add the new message source to the database according to the appropriate hostname/IP address identifiers, in process element 139. If the auto virtual message source registration process is successful, in process element 142, the mediator server may send a virtual message source reply message to the log agent, in process element 141, such that log messages from those registered devices may be properly processed. If the auto virtual message source registration is not successful, the mediator server may alternatively send a failed message source authentication message to the log agent, in process element 138, to, e.g., alert the log agent that those particular log messages are not to be forwarded to the log manager. Similarly, if no available message source license exists (i.e., process element 143), the mediator server may send an unlicensed message source message to the log agent, in process element 140 to similarly discontinue processing of log messages.

The mediator server process ensures that only authorized and authenticated log agents connect to the log manager by terminating unauthorized connections. The server process inserts forwarded log messages into the log manager database setting default on-line lifetimes (e.g., the time that a particular log message is available and generally referred to as the time-to-live of a log) and archiving parameters. Communications between the log agents and the mediator server process are generally TCP based and can be encrypted, as described above. Additionally, the mediator server monitors system loads and communicates such information to log agents to ensure log message peaks do not overwhelm the system. In cases where the mediator server process becomes to busy or goes into its daily maintenance cycle, the server can direct connected log agents to fail-over to backup log managers. The log agents may then periodically try to reconnect to their primary log manager.

The mediator server maintenance process (described in flowchart 100 of FIG. 9) is generally responsible for performing routine system maintenance tasks and archiving log messages for off-line storage. This process is typically scheduled to run once daily during off-peak hours. During each maintenance cycle, log messages are evaluated to determine if their on-line lifetime has expired. However, archiving may be performed according to a user configured schedule, without regard to the maintenance cycle. In such an embodiment, the maintenance process removes logs that have expired according to the time-to-live value and a separate process archives log messages. This process can run continuously (e.g., always checking for new logs to archive) and/or it may be configured to run periodically (e.g., check for new logs every 5 minutes). Alternatively or additionally, the archive process can be run within a window of time (e.g., start archiving logs between the hours of 5 PM and 5 AM)

A time-to-live value generally determines the number of days the log message should be stored on-line in the log manager database. Messages having an expired time-to-live are deleted or archived based on the archive setting for the source of the log. Logs having an expired time-to-live and marked for archiving are written to an archive file and then deleted from the log manager database. That is, the logs that are marked for archive are written to the archive files independent of the time-to-live value. In this regard, they may be archived days before the time-to-live expires. Once the time-to-live has expired and once the log has been archived, the log removed from the on-line database. Additionally, archive files can be automatically compressed to save space before being moved to long term storage. Archive files can be imported back into a log manager to support historic analysis requirements as in the case of a forensics investigation or audit. Archiving is shown and described in greater detail in FIGS. 13 and 14.

As mentioned, the log managers also have an MPE, such as MPE 54, which processes each log entry in the database against event rules and policies and forwards the log entries as events to an event manager, such as event manager 14. The MPE can run as an independent service in the log manager or be compiled into the mediator server in the log manager. The MPE identifies, classifies, and transfers log messages as events to the event manager by means of a rules engine that compares log messages against a list of user configurable MPE rules. As mentioned above, the MPE rules are generally written in a standard regular expression notation combined with a tagging system to identify and parse common log information such as IP addresses, TCP/UDP port numbers, and login names. A rule builder tool exists that facilitates the development and testing of MPE rules such that customized rule development is possible. The rule builder tool generally is assigned default values for log messages that include, among other things, time-to-live for the log message, archival decisions, event manager forwarding decisions, and risk analysis. However, these default values may be overridden at a user's discretion.

The management of MPE rules is policy based. For example, rules are assigned to one or more policies. Within a policy, the rules default values for time-to-live, archiving, event forwarding, and risk can be customized. Policies are then assigned to message sources (e.g., a specific source of log messages forwarded by a log agent). Security event log of an IIS web server as well as individual syslog files on a Linux server may be considered exemplary message sources within the context of the log management system. Additionally, these MPE rules may assign shared or custom MPE rule policies at the message source level provides low-level control over log message management. For example, a failed login message from one system could be ignored while the same message from a different system could be promoted to an event and forwarded to the event manager.

Figure 11:
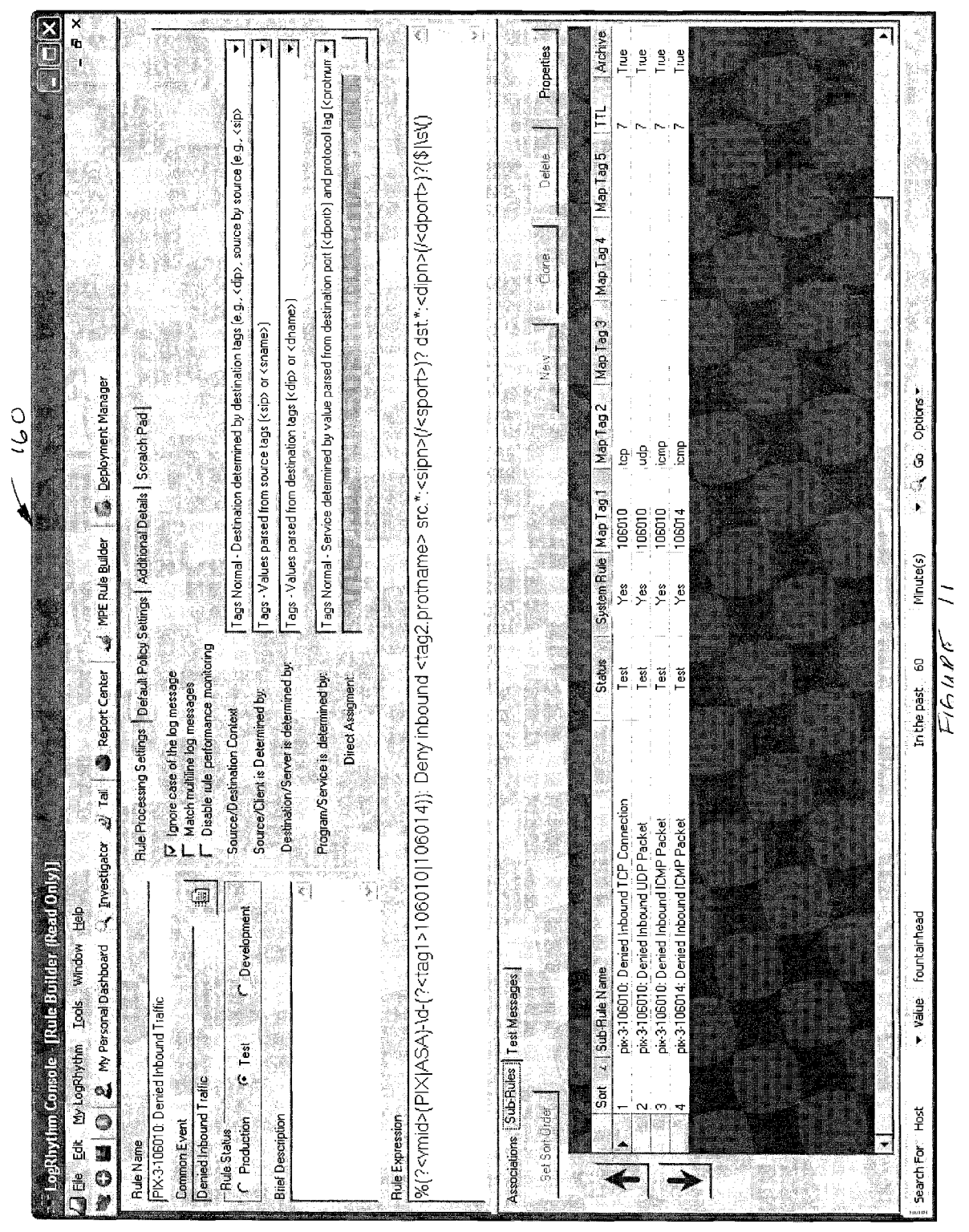

The customization of MPE rules is illustrated with the application interface 160 FIG. 11. Each MPE rule generally consists of a base rule and one or more optional sub-rules. A base rule includes a tagged regular expression code. Sub-rules, however, generally do not include regular expressions; rather, sub-rules use "map tags" to extend the base-rule. However, the base rules and the sub rules for each configured with certain process settings that control how similar log messages are processed, many of which can be overridden based on user preference. Examples of these settings are illustrated in application interface 160 and include default time-to-live (e.g., which controls the number of days matching log messages should remain available with the mediator before being archived and/or permanently deleted), default archive (e.g., which controls whether matching log messages should be archived when TTL expires), ignore case (e.g., controls whether the regular expression should ignore the case of text characters when comparing log messages against certain rules), match multiline log messages (e.g., controls whether the MPE should match log messages after any "new line" characters), source/destination context (e.g., controls how the source and destination of an event are determined), source/client is determined by (e.g., controls how a source is identified), destination/client is determined by (e.g., controls how a destination is identified), and program/service is determined by (e.g., controls how to associate the correct program/service with the log entry). Other attributes include a brief description (e.g., 255 characters), additional details (e.g., roughly 2000 characters), scratch pad (e.g., a temporary area text that can be used in developing rules, but generally not saved), and rule expression (e.g., a tagged regular expression that identifies and parses data from log messages).

To illustrate rule development with respect to parsing tags, default regular expression code may be included as part of the tag. To use the default regular expression code, a tag name should be placed directly between less than (<) and greater than (>) signs. For example, to parse the source IP, one would place <sip> at the point in the log message where the source IP address is located. To parse a login, one would place <login> at the point in the message where the login information is located. The tag generally includes regular expression code to more readily facilitate rule development. An exemplary log message is now shown to illustrate the parsing that is available with the rule development.

Oct 21 15:45:47 Trinity sshd[632]: Failed password
for root from 10.1.1.103 port 53495 ssh2

One rule that may be developed to parse the log message would be:

.*Failed password for <login> from <sip> port
<sport>.*

This rule matches anything up to the words "Failed password for". Afterwards, the rule may match a default regular expression for login, followed by matches for the word "from", the default regular expression for a source IP address and a source port.

Occasionally, customized regular expression may provide more beneficial results than the default regular expression. Accordingly, an MPE may process a more specific rule faster. Implementing such may be done using the expression (?<tag> regex), where tag is the tag name (e.g., sip, dip, sport, login) and regex is the regular expression code used for matching the part of the log data to be stored in the report field associated with the tag. To illustrate, an exemplary log message is now shown the parsing that is available with the rule development.

Oct 21 15:45:47 Trinity sshd[632]: Failed password
for root from 0.1.1.103 port 53495 ssh2

One rule that may be developed to parse this log message would be:

.*Failed password for (?<login>\w+) from <sip> port
(?<sport>\d+).*

This rule may match anything up to the words "Failed password for". Afterwards, the rule may match "\w+" (e.g., one or more word characters), parse the data as the login field, match "port", and match "\d+" (e.g., one or more digit characters), and parse the data as a source port.

To illustrate sub-rule development with respect to mapping tags, the following log message is provided:

Jul 22 02:33:22 deny inbound packet src=66.4.4.2:
56543 dst-89.2.2.1:25 prot=6

For this log message, there are five capturable report fields: source IP; source port; destination IP; destination port; and protocol. To capture these 5 fields, a rule may be configured as follows:

.*deny inbound packet src<sip>:<sport>dst=<dip>:
<dport> prot=<protnum>

However, this rule may be easily modified as another rule by using mapping tags that, for example, identifies dropped packets to specific servers or ports. In this regard, the rule may use mapping tags to create sub-rules. To do so, the rule may be configured as follows:

.*deny inbound packet src<sip>:<sport>dst=<tag1>:
<tag2> prot=<protnum>

The MPE may accordingly compare the data matched by tag1 and tag2 against a list of sub-rules. If a matching IP address and port number is found, the log message may be associated with the sub-rule. If a matching sub-rule is not found, the base rule may be associated with the log message.

A problem, however, may exist with the modified rule because the <dip> and <dport> tags result in the destination server and destination port report fields no longer being populated. Such may be taken into account via the combination of mapping tags with parsing tags. Generally, there are five mapping tags are available for use shown in the following table:

| Mapping Tag | Matched Characters | Default Regular Expression |
| --- | --- | --- |
| tag1 | 100 | .* |
| tag2 | 100 | .* |
| tag3 | 100 | .* |
| tag4 | 255 | .* |
| tag5 | 1000 | .* |

The default regular expression is the same for each (i.e., ".*") with the only differences being in the amount of data that the expressions match against. When data in a log message is used for both mapping and reporting purposes, it is possible to combine a map tag with a parse tags. The notation for a mapping tag/parsing tag combination is <[maptag].[parsetag]> and an example of such is <tag1.login>. This notation is much shorter than using a defined expression that includes the regular expression code. For example, the notation of a defined expression would be in the format of (?<[maptag].[parsetag]>[regexcode]) and an example of such is (?<tag1.login>\w+). Examples of tags and their associated definitions are illustrated in Appendix A to the patent application. Examples, of regular expressions and their associated definitions are illustrated in Appendix B to the patent application.

Figure 12:
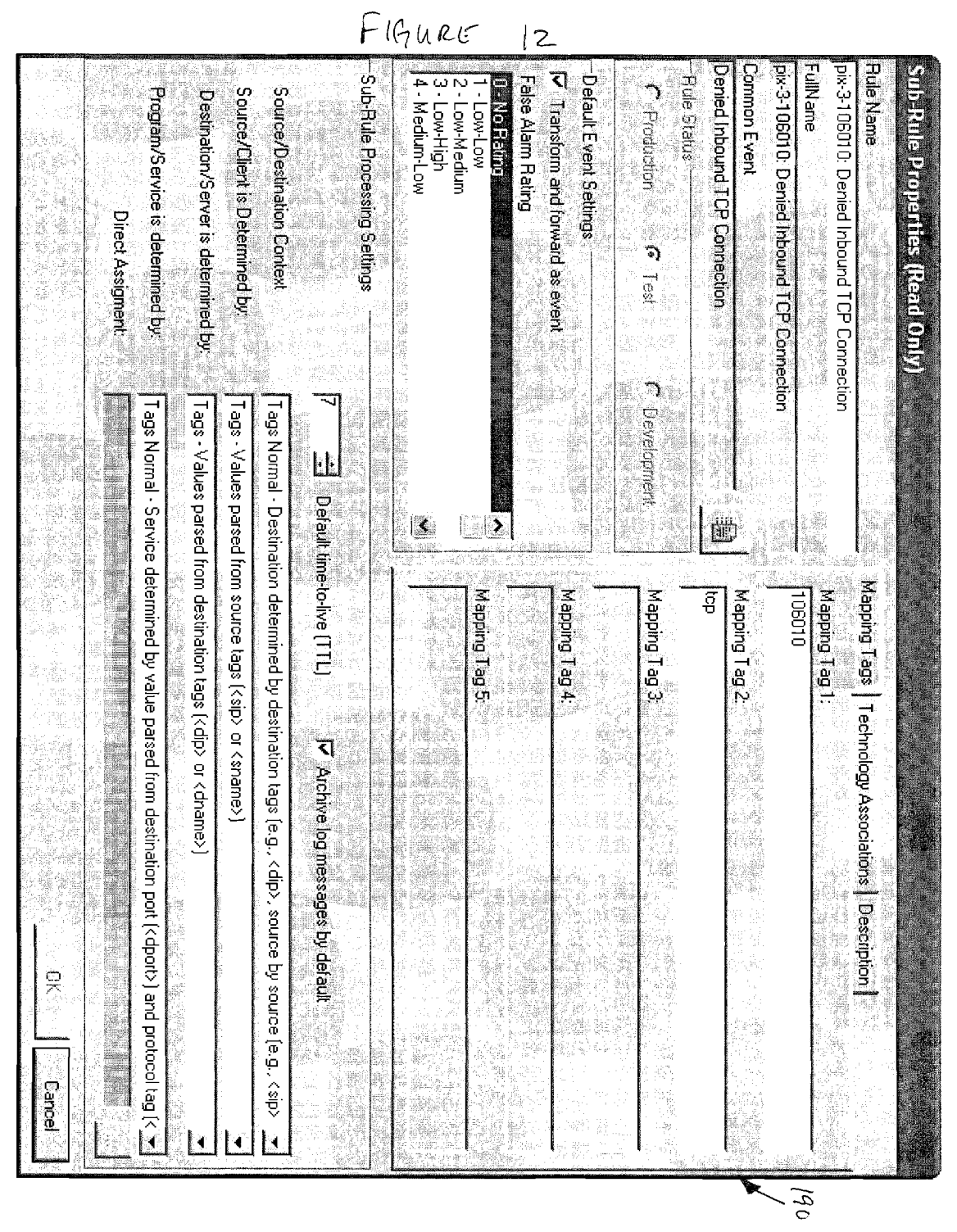

The customization of MPE sub-rules is illustrated with the application interface 190 FIG. 12. When creating a sub-rule, unique values for the rule may be assigned including name, default TTL, risk ratings, etc. Log messages matching a sub-rule may be associated with the sub-rule and assume applicable sub-rule values. As mentioned, one difference between creating a sub-rule and base-rule regards the use of mapping tag values are entered to enter specific matches of the base-rule based on the data matched by the mapping tags. The sub-rule is generally not directly associated to a message source type. Rather, this association is derived from the base-rule. When creating sub-rules, it is possible to specify wildcard values for a given map tag value. The preferable wildcard character is an asterisk, as is typical in many wildcard notations. The wildcard may be used when the sub-rule is intended to match any value for a specified mapping tag.

Based on such MPE rule configuration, a use can configure an MPE rule that assists in the identification and classification of log messages. For example, when a log message matches an MPE rule, the message may be updated by the log manager to reflect the rule settings for time-to-live and whether the message should be archived. Irrelevant log messages are thereby tagged for removal with other log messages (e.g., those with no reporting value) may be tagged for archival and subsequent removal. Messages that have reporting value are updated with the appropriate time-to-live and are accordingly archived or deleted when time-to-live expires.

The MPE rules may also assist with event preparation. For example, when a log message matches a particular rule, the log is prepared for analysis, monitoring, and reporting by parsing useful information from the text of the log into reporting fields. Examples of such parsable information include source IP addresses, source names, destination IP addresses, destination names, source ports, destination ports, protocols, and logins. Additionally, users can parse other information into customizable user fields. After the MPE has prepared the event, the log record stored in the log manager is updated. If forwarding is enabled, the log and the parsed report fields are saved in by the event manager for use in monitoring, analytics, alarming, and reporting, discussed hereinbelow.

Figure 13:
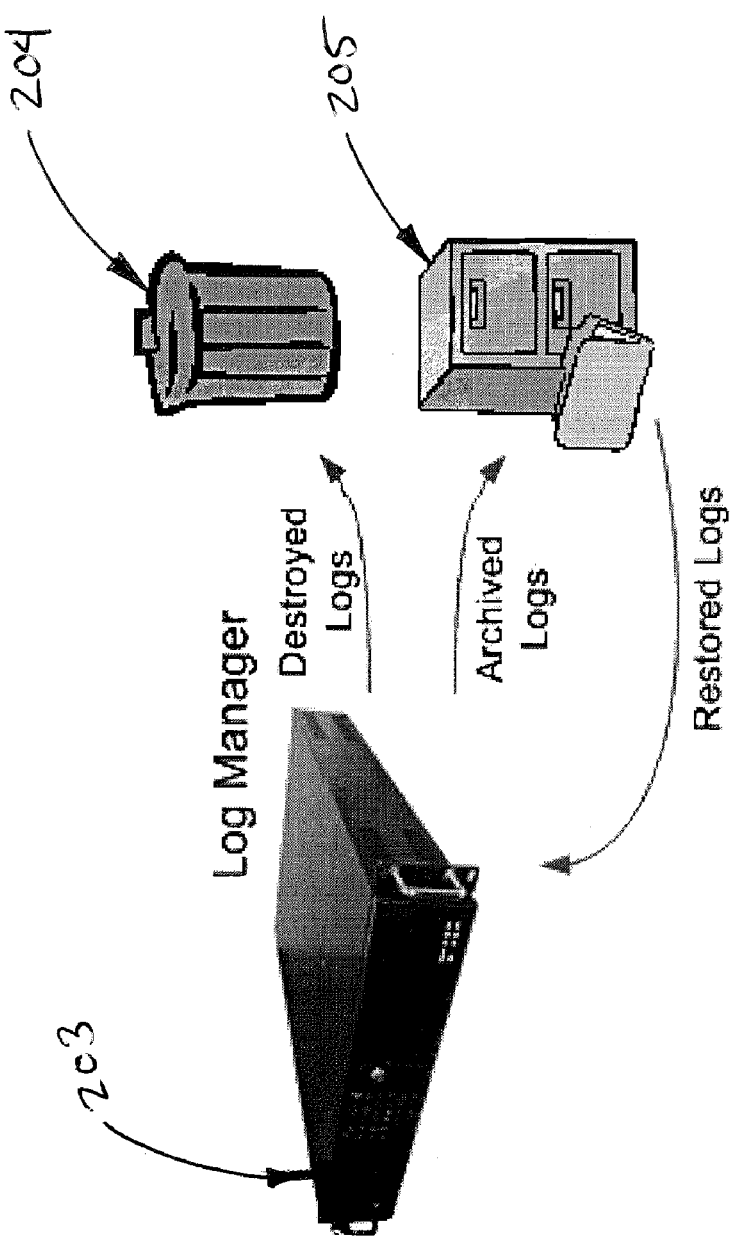
FIG. 13 is a block diagram of a log manager illustrating archival and destruction of retrieved logs.

Before discussing aspects of the event manager (e.g., event manager 14 of FIG. 1), however, another aspect of the log manager is now discussed. In this regard, FIG. 13 illustrates archival and destruction of retrieved logs a log manager 203. The log manager 203, according to rule settings described here and above, may automatically archive or destroy certain logs. For example, a user of the log manager 203 may develop a rule that collects a particular type of log message. The log entries may be stored in original form, tagged with meta data, and assigned a "normal date" (e.g., a timestamp of the log entry date synchronized to a Standard Time, such as Mountain Standard Time). The log manager 203 may collect those log messages for a certain period of time and write those messages to archive files. In this regard, the log messages may be retrieved (i.e., restored) for viewing thereafter.

In one embodiment, a user may configure customized rules that archive log messages as the user desires. For example, a rule may be configured that writes log messages to an archive file based on various features and/or parameters of the log message (e.g., the IP address and/or the name of the system that generated the message), metadata associated with the log message, date/time, etc. In this regard, a user may retrieve archived log messages according to one or more of these features and/or parameters when desired. For example, a log message that is stored based on its associated metadata may also be retrieved based on that metadata.

This capability may provide certain advantages in regards to reporting. For example, in light of certain laws, regulations, and/or guidelines, computer use documentation and reporting has now become a requirement to some companies. Examples of such laws, regulations, and guidelines include the Sarbanes-Oxley Act, the Health Insurance Portability and Accountability Act, Gramm-Leach-Bliley Act, the Basel Accord II, the Visa Cardholder Information Security Program, Federal Financial Institutions Examination Council guidelines, the Federal Information Security Management Act, etc. The ability of the log manager 203 to archive log messages may assist in that reporting (e.g., by recording the normal time of a log message that indicates that a certain document that was deleted thereby providing evidence that the document existed). Alternatively, other types of logs may be deemed unnecessary or unwanted after a certain period of time. In this regard, the archival process may be implemented by configuring a rule according to the time-to-live functionality described hereinabove such that logs may be destroyed (i.e., removed from memory 204). Additionally, the time-to-live parameter may be used to implement the archival. For example, a log may remain active for a certain period of time. After that period of time has passed, the log message may be written to an archive file. An exemplary interface for archive restoration or destruction is illustrated the archive restoration interface 220 of FIG. 14.

In one embodiment, the log manager 203 consolidates logs for archival and database 205. For example, a log message may be collected by the log manager 203 over a period of time, such as a year. The data that is conceivably collected during this period may be tremendously large (e.g., on the order of terabytes). To reduce storage requirements, the log manager 203 may simply note the time (e.g., be a timestamp) and/or frequency of the log message within the collection period. Alternatively, log messages may be compressed using data compression means (e.g., by creating zip files) to provide reduced storage requirements. In some instances, log messages may be compressed to 5 to 10% of their original size. In yet another embodiment, log managers may be distributed to provide distributed archival. For example, multiple log managers may be assigned the task of collecting a certain type of log message. The distributed log managers may cooperatively archive these log messages in the manner described, thereby providing increased reporting capability and/or storage capability. Alternatively, storage of the logs may be performed on a separate server (e.g., separate from the log manager 203) so as to provide a larger storage capacity. For example, server and storage architectures may be configured to provide vast amounts of storage and redundancy (e.g., RAID storage systems) that can be communicatively coupled to a log manager to offload the archival processing of the log manager.

In one embodiment, the archiving is performed in real-time. That is, logs that are marked for archive may be archived as soon as the logs are collected. Other logs may be processed according to MPE rules and immediately be deemed unwanted or unnecessary. As such, these laws may be destroyed upon collection (i.e., remove from memory 204). Still, even though such logs may be removed from memory, MPE rules may be configured to record certain information about a particular log such that the log may be reconstructed at a later date. In this embodiment, the archival process may be configured with a local configuration file that provides for event manager database credentials such that events may be constructed from archived logs. Additionally, this configuration file provide for access to the archived logs through log manager accounts.

The archival process may maintain a local state file and periodically update that file. For example, the local state file may include a central state parameter that controls the manner in which log messages are automatically archived in an external archive database. In this regard, the log manager 203 may periodically update the central state parameter in a manner that coincides with the archival objectives of the log manager. Additionally, the archival process may maintain a model of active and inactive archive files. For example, certain log messages from a particular computer system may be consolidated and/or compressed into a single file. This file may be updated with other log messages that are collected from the computer system. When collection of the computer system ceases, the archival process may maintain the file and categorize it as inactive but maintained it for subsequent viewing.

In one embodiment, these archived files are hashed or digitally signed to ensure the files have not been tampered with between writes. One example of a hash is the SHA1. In such an embodiment, the file may be hashed using the SHA1 such that the data of the file may be verified as accurate via a hash fingerprint comparison. In another embodiment, digital signatures may be used to sign archive files. In this regard, public and private digital signature keys may be generated for archive signing (e.g., public/private keys of PGP, Inc.'s encryption algorithms). The private key is used for signing archive files and may remain in memory until new keys are generated. The public key and associated parameters may be stored in a table maintained by the event manager database such that other processes can verify the integrity of archive files via the digital signature verification mechanism. New signing key pairs are periodically generated. For example, signing key pairs may be generated each time a new archiving process starts or after a certain period of time has been reached (e.g., a digital signature maximum age configuration parameter as determined by a predetermined retirement date for the digital signature).

In one embodiment, active archive files are protected with a SHA1 hash code, or fingerprint. The SHA1 hash fingerprint is used by the archiving process to ensure that active archive files are not tampered with between writes. The collection of SHA1 hashes for the active archive files is persisted to disk if the archiving process is shut down to be read when the archiving process is restarted. Once an active archive is changed to an inactive archive file, the inactive archive file may be digitally signed and then compressed. The inactive archive file is generally signed with the private key of a private-public key pair. The public key of this pair along with additional data describing the archive file (e.g., filename and/or file meta-data) is stored in the event manager database for use in later signature verification. When the inactive archive file is accessed for log message restoration purposes, the public key along with the signature data in the event manager database may be used to verify the file signature. If the signature verification succeeds, the inactive archive file is opened and the logs within are restored for analysis. If the signature verification fails, the user is notified that the file has been tampered with and the file is moved to a quarantine location.

Figure 15:
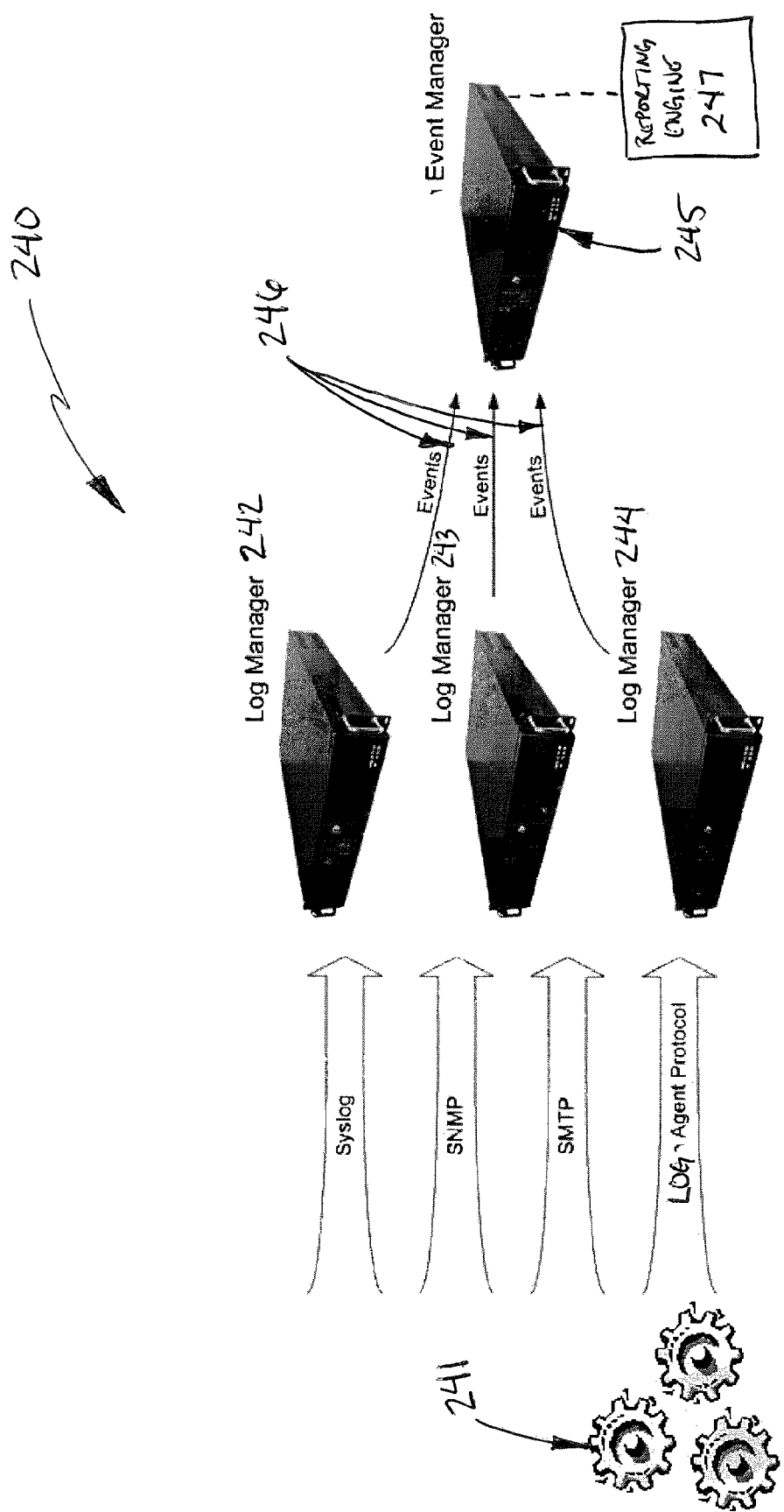
FIG. 15 is a block diagram of an event manager operable within a log management system.

Turning now to FIG. 15, the discussion of the log management system is directed to the event manager 245. In FIG. 15, a log management system 240 includes the log managers 242-244 configured for receiving log file data via various protocols (e.g., syslog, SNMP, SMTP, the log agent 241 protocols, TCP/IP, Netflow data, etc.). In this regard, log managers 242-244, and for that matter the log agent 241, may provide all or a portion of the log message collection and processing functionality as described herein above. Accordingly, the focus of the discussion is placed on the events 246 that are generated by the log managers subsequent to the processing of the collective log messages. For example, certain log messages may be processed and stored in a log manager may be identified as interesting or special by the log manager based on user configurable rules and policies. Any log entry corresponding to one of these rules may then be promoted to an event by the log manager. Generally an event consists of the original log entry plus a set of normalized data fields, such as IP addresses or a login name extracted from a log of interest. The most interesting events can be forwarded to the event manager for processing and potential alarm generation. Other less interesting events may remain at the log manager for forensic analysis & reporting purposes.

Figure 16:
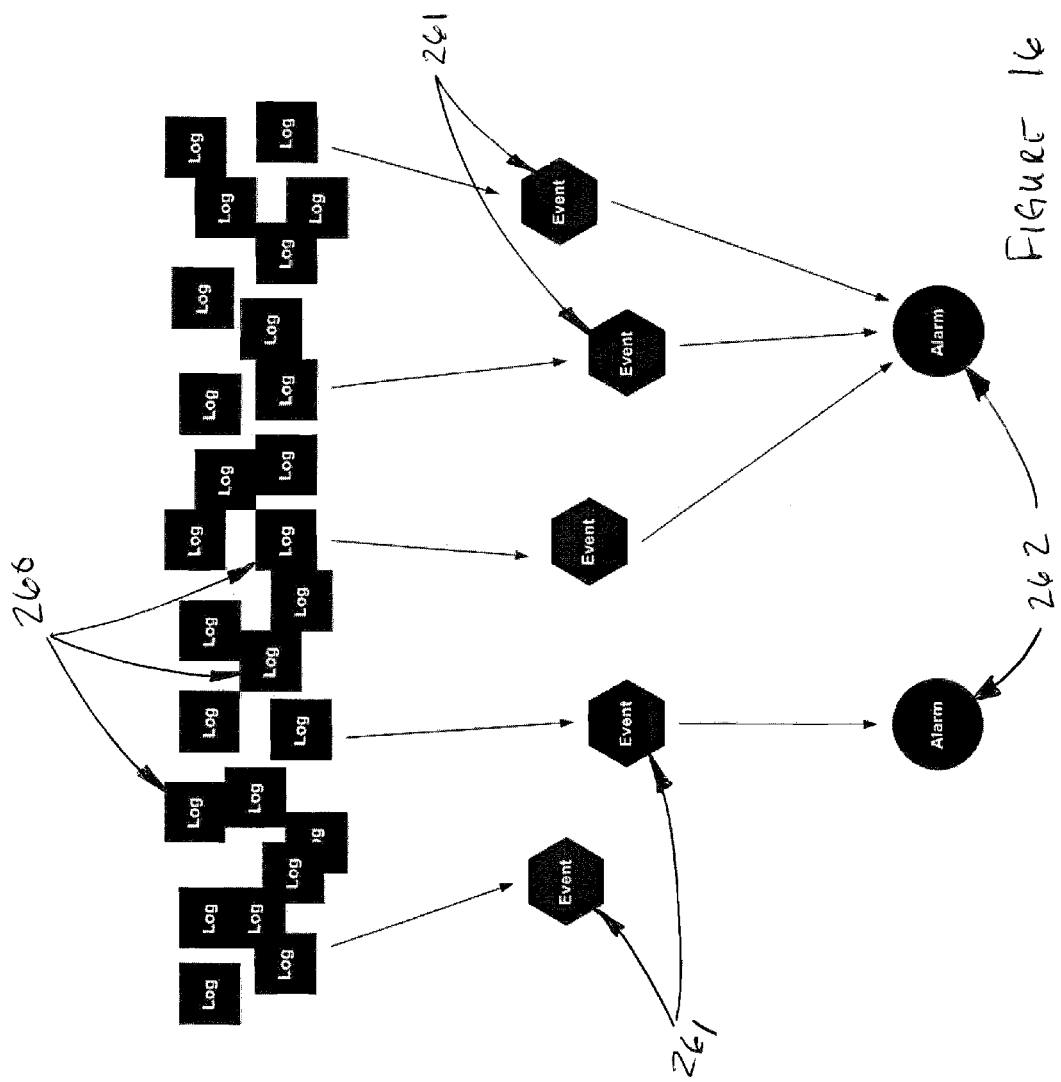
FIG. 16 illustrates a flow of data originating as log messages and culminating as alarms.
Figure 17:
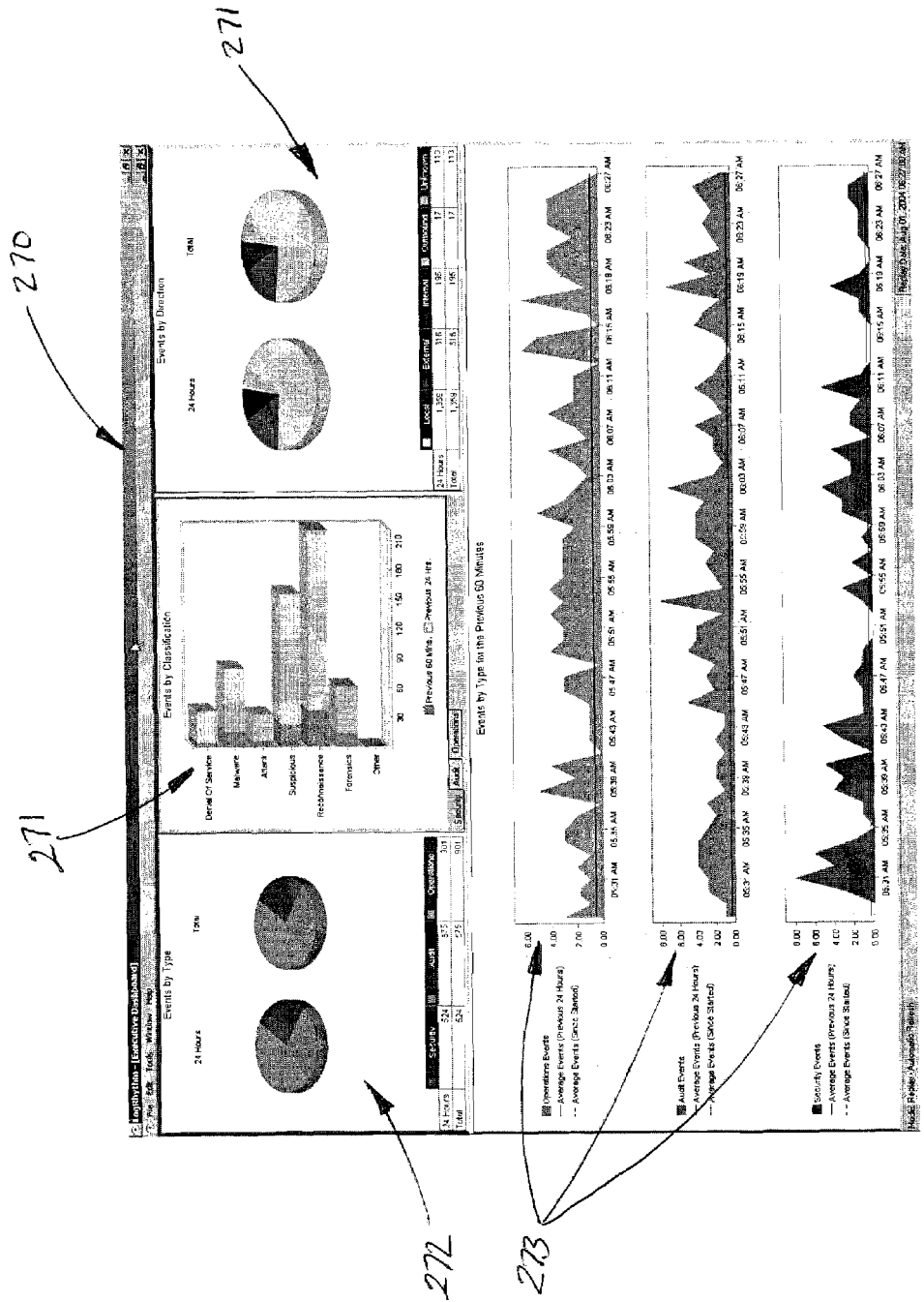
FIG. 17 illustrates a dashboard interface that provides a real-time view into event collection by an event manager.

To illustrate, FIG. 16 shows a plurality of logs 260 being generated, for example, by a number of computer systems. The logs 260 are forwarded to the log managers 242-244 for processing. As the log managers 242-244 process the logs 260, certain events 261 may be extracted therefrom. Generally, each of the events 261 may be processed by the event manager 245 to determine whether alarms 262 should be generated. As illustrated, in FIG. 16, not all events are deemed alarm worthy. Rather, certain events may be processed by the event manager 245 to determine any potential informational value of the event. For example, the event manager 245 may cache a particular event to observe re-occurrence.

Other events may be simply made available/visible to a user in real time and removed immediately thereafter. For example, the event manager may include a "dashboard" 270 that provides a view into events. Additionally, the dashboard 270 may be configured with analysis tools that provides various metrics (e.g., the frequency of a particular event—views 273, the number of events and their classifications—the view 271, the relative breakdown of events by type—the view 272, and the relative breakdown of events by direction—the view 271) such that an operator (e.g., IT personnel) of the event manager can make various decisions. For example, certain events or series of events may be promoted to alarm status based on user specified alarming rules and policies. Accordingly, an alarm may be generated based on these rules and policies to alert the operator to take action. In this regard, for any event to be considered for alarm generation, the event is generally forwarded to the event manager.

Figure 18:
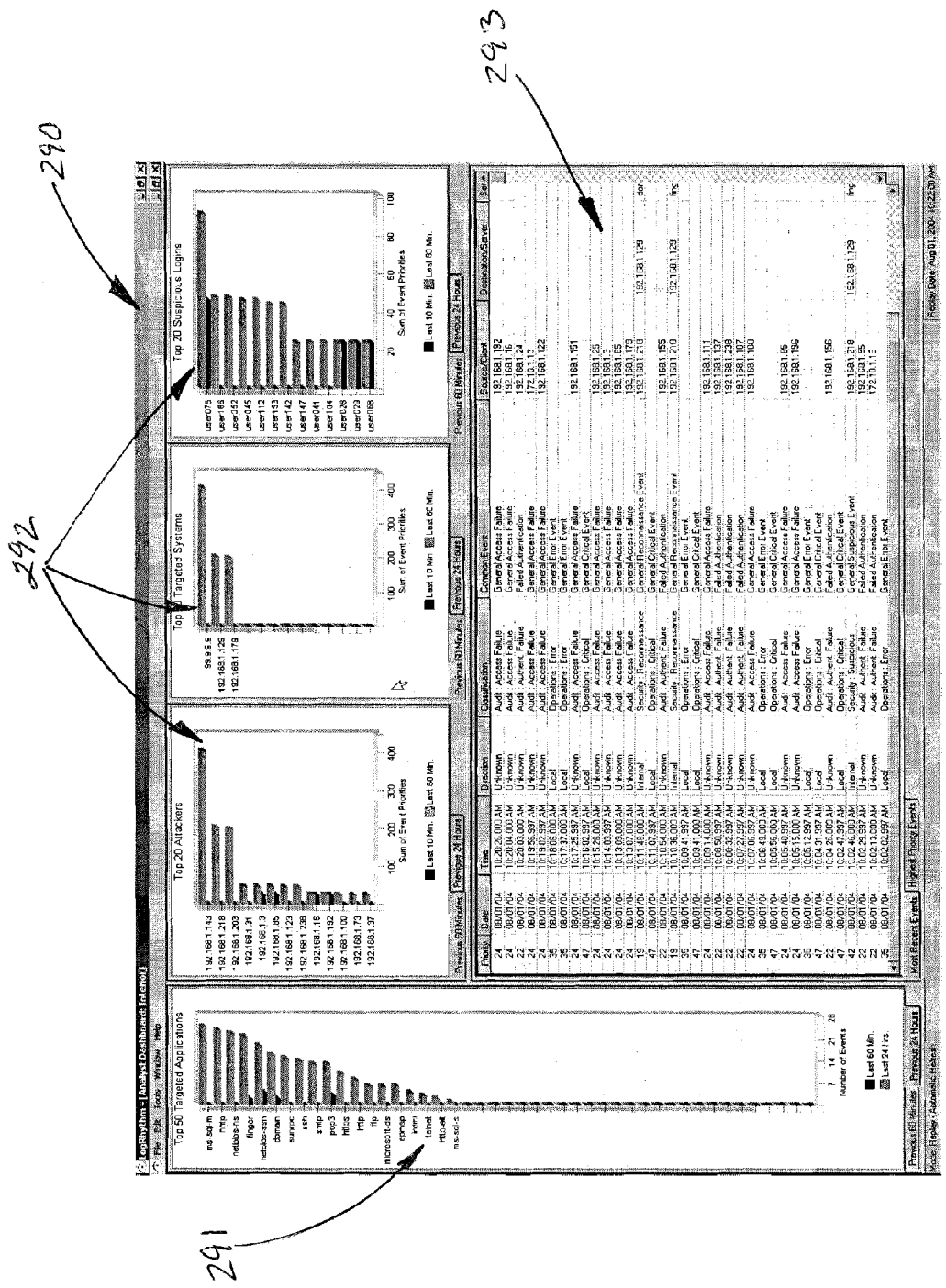
Figure 19:
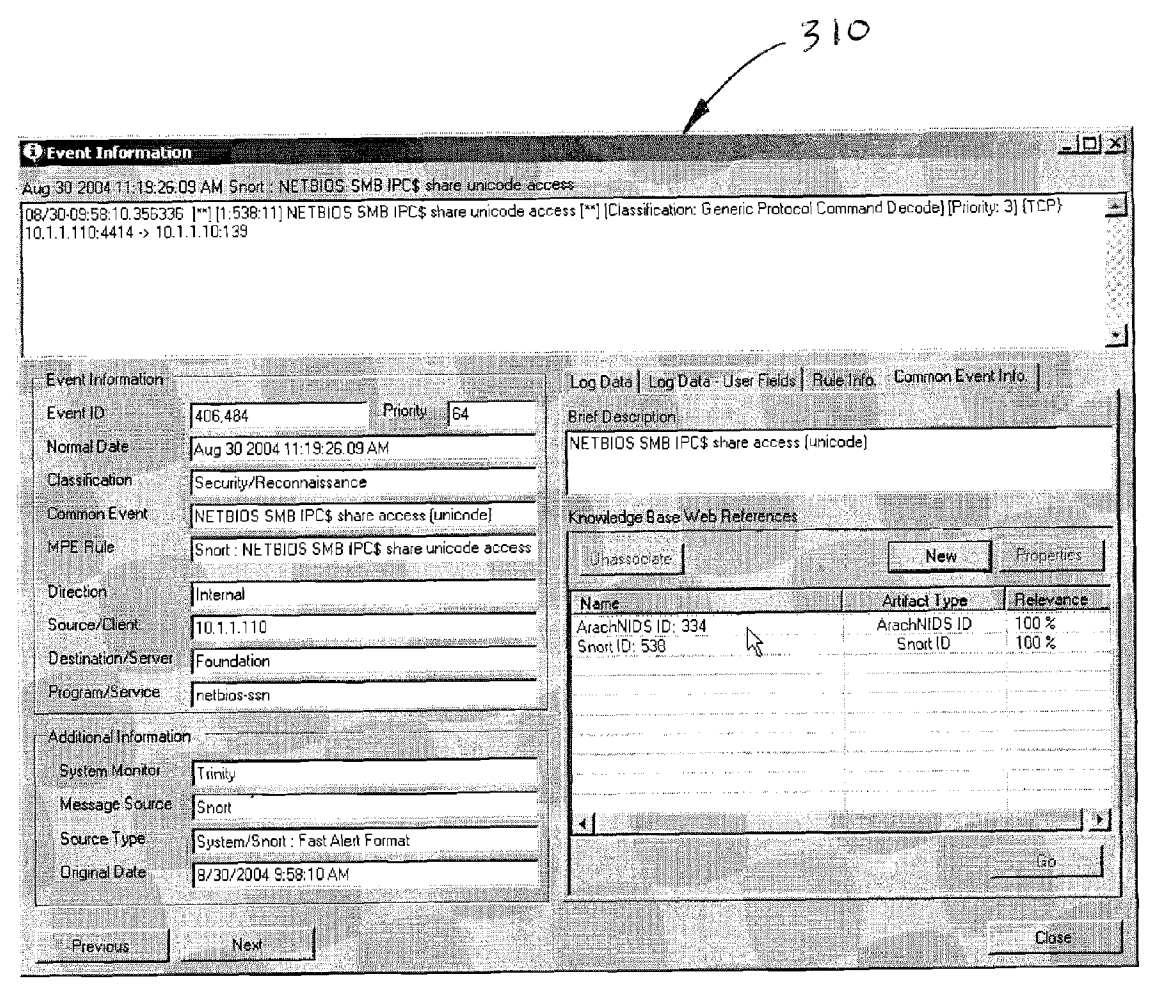
Figure 20:
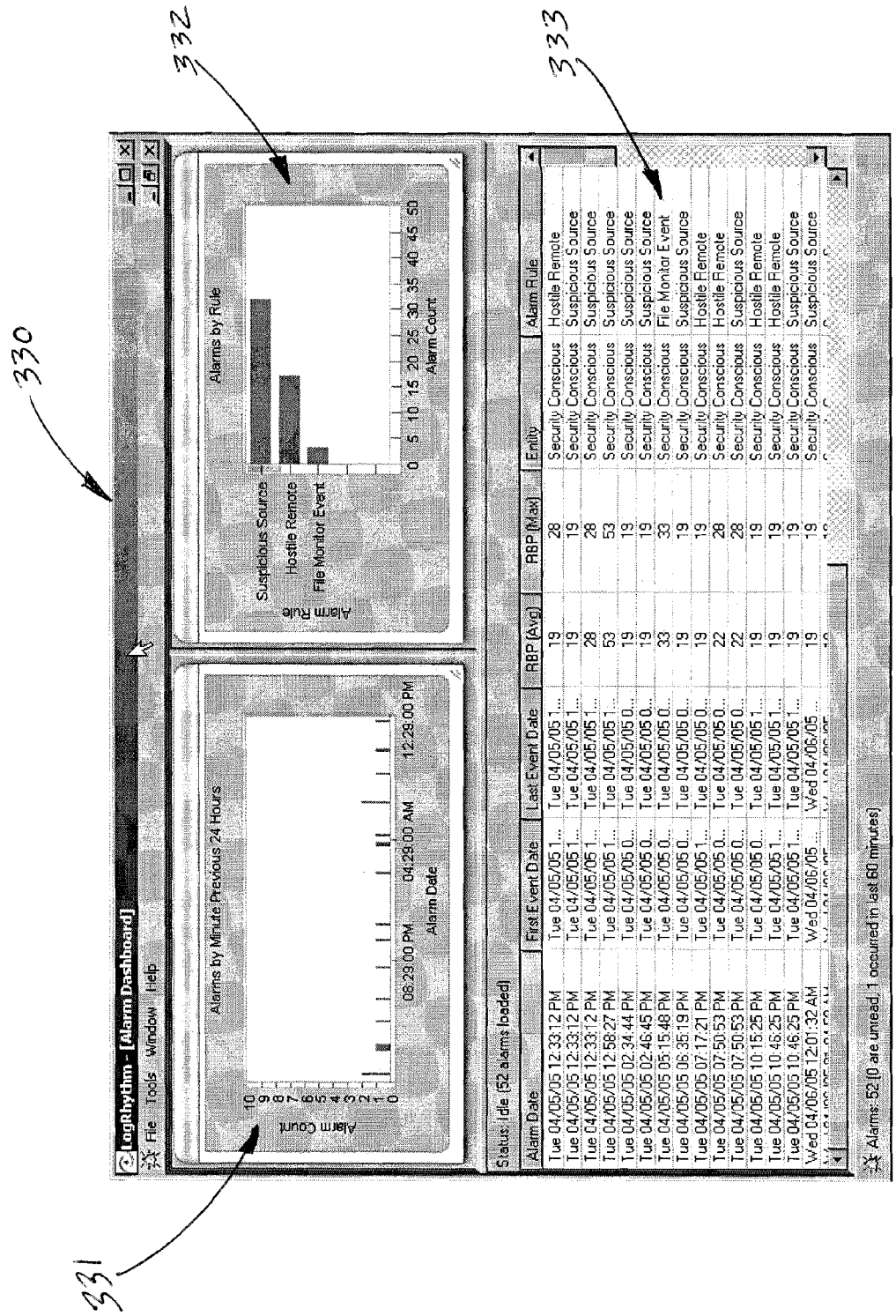
FIG. 20 illustrates a dashboard interface to alarms that are generated from certain events.
Figure 22:
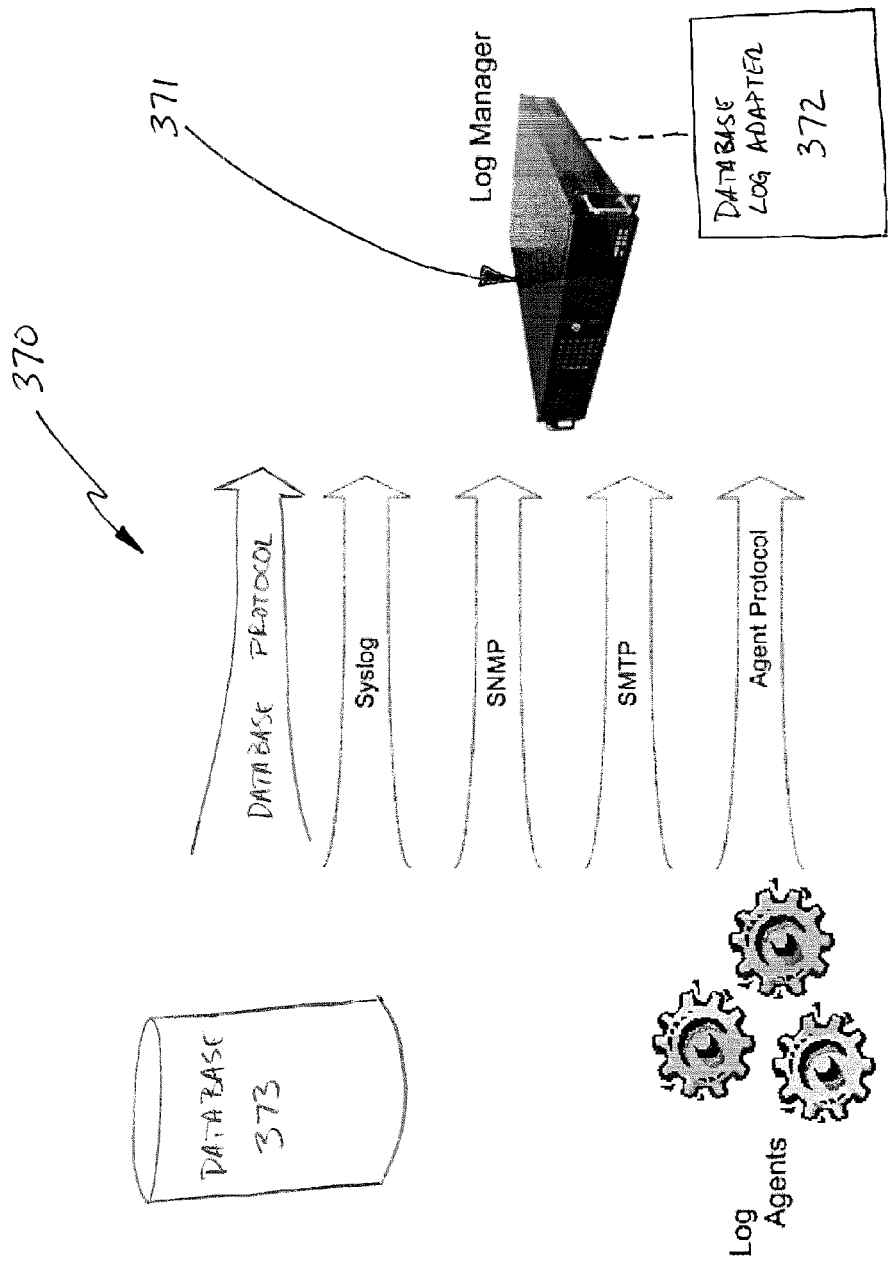
FIG. 22 illustrates a log manager configured with a database log adapter that communicates with a database.

FIGS. 18 and 19 illustrate other interfaces that are accessible by the dashboard to provide additional information to the operator. For example, in FIG. 18 the dashboard interface 290 provides event information pertaining to targeted applications (e.g., events that may generate alarms indicating an attack on certain software and/or hardware applications, such as a hack on a web server) in view 291. In the views 292, information on activity originating inside a network is displayed to the operator (e.g., an internal network user accessing unauthorized information). In this embodiment, the views 292 provide a ranked compilation of log activity for the top 20 IP addresses suspected of attacking the network, a ranked compilation of log activity for the top 20 IP addresses suspected of being attacked, and a ranked compilation of log activity for suspicious logins (e.g., an unauthorized user attempted to gain access through another user's login). Additionally, the interface 290 may provide the view 293 to illustrate a summary of the most targeted applications and systems with sortable fields that include, among other things, a priority ranking of the events, the dates and times of the events, the direction of the log activity (e.g., attacks on the network or unauthorized access attempts to the network), the type of event that resulted from the log activity, the source of the log activity (e.g., the IP address of the system causing the event), and the intended destination of the log activity (e.g., the IP address of the targeted system).

More detailed information regarding the above-mentioned events may be obtained with the event information view 310. This view may be accessed by selecting a particular event, for example, from the view 293 of the dashboard interface 290. For example, the interfaces described herein (e.g., dashboard interface 270, dashboard interface 290, etc.) may be graphical user interfaces operable within the context of a software application. In this regard, a user wishing to access more detailed information pertaining to a particular event they simply mouseclick on the event to bring up event information view 310. Examples of the more detailed information that the event information view 310 may provide include an event ID number, the identification of monitoring system (e.g., the log manager/log agent), and MPE rule used to flag log activity as an event.

Similar in design to the event dashboard 270 of FIG. 19, the alarm dashboard 330 provides a view into the alarms generated by various events. For example, rules may be configured with the event manager 245 to process events transferred from various log managers connected thereto (e.g., log managers 242-244). In this regard, the event manager 245 may determine that certain events require immediate attention and automatically generate an alarm message to notify relevant personnel. Alarm rules can be created based on essentially any combination of event data, such as an event type, a targeted host, and/or a particular application. For example, an alarm rule may be configured to generate an alarm whenever an event indicates that a terminated user account is being used.

The alarm dashboard 330 is illustrated, in this embodiment, with various views to provide alarm information to a user of the dashboard. For example, the view 331 provides a raw count of alarms generated within a selected time (e.g., 24 hours). The view 332, however, provides some general information pertaining to those alarms. For example, the view 332 may indicate that certain alarms are associated with suspicious sources activity, hostile remote activity (e.g., denial of service from external sites), and unauthorized accesses (e.g., file server monitoring) as designated by alarm rules. The view 333 provides even more information pertaining to alarms. For example, the view 333 may show the timestamp of a generated alarm, how the alarm relates to various events, and the associated activity as designated by the alarm rule.

Alarm rules described herein are generally of two types, default alarms and user configurable alarms. For example, certain alarms may be provided with the event manager to automatically alert a user of a certain event without user feedback. Such alarms would generally be those that a user would find exceptionally important, such as a denial of service attack, attempted unauthorized access to a file server, etc. Other rules, however, may be customized according to a user's desires. Additionally, alarm rules that are customized to flag certain events may also be managed in a customized fashion. For example, FIG. 21 illustrates a rule manager interface 340 that shows a user the present customized rules that are being implemented by the user. In this regard, the interface 340 may allow a user to edit a particular rule to generate alarms and other matters.

Although shown and described with respect to an alarm being displayed with the alarm dashboard 330, the invention is not intended to be limited to such alarm notification. Rather, event manager 245 may automatically communicate alarms to one or more responsible authorities (e.g., IT personnel, security officers, company officers etc.). In this regard, certain generated alarms may be associated with individuals or groups. For example, a denial of service alarm may be associated with IT personnel to alert them so that they may take appropriate action. In contrast, an attempted unauthorized access into a network account may alert a security officer of the attempt without the need for interaction by IT personnel. While the means for communication of the alarms may vary, one exemplary implementation of such communication may be e-mail. For example, many portable devices are capable of wirelessly receiving e-mail (e.g., cell phones, Blackberries by RIM, etc.). Accordingly, the event manager may automatically send e-mail addresses to such wireless accounts to rapidly alert appropriate personnel.

Generally, alarms provide real-time alerting functionality with less analysis capability. Such is the case because alarms in general are provided for immediate attention and/or rapid response. However, longer term trends are often desired. For example, a business may be required to report certain events occurring in their network (e.g., unauthorized access to banking networks). In this regard, the utility of the present invention also provides for certain analysis and reporting features that may be used to illustrate such trends.

In one embodiment, the event manager may be configured with a reporting engine that detects statistical features of events so as to generate alarms. For example, the event manager 245 of FIG. 15 may include a software component (e.g., reporting engine 247) that detects the events 246 transferred from log managers 242 through 244. Certain events may include unique information that the reporting engine 247 analyzes to determine if the information is reoccurring. In this regard, the reporting engine 247 may determine that certain events over a period of time are similar and indicative of a trend. The reporting engine 247 may generate an alarm that alerts a user to the trend or departure from a known trend so that appropriate measures may be taken. To further illustrate, an event may be transferred that includes information pertaining to a computer system user that is attempting access to a restricted file or computer. Each of the generated events may not be necessarily worthy of generating an alarm. However, over time, the events may accumulate to form a sort of pattern that may be worthy of an alarm (e.g., the same person attempting access to many different restricted files over a period of time or a group of people continually attempting access to a particular restricted file). Accordingly, the reporting engine 247 may generate alarm that represents such information so that the appropriate personnel to address the situation.

The reporting engine 247 may include an interface (e.g., a GUI) that enables a user to customize alarm generation. For example, various events statistics (e.g., frequency of events, duration of events, type of events, dates of events, etc.) may be selected and/or combined by a user through the interface. These alarm configurations may be stored as rules with the reporting engine. Accordingly, the reporting engine 247 may detect events over a period of time that correspond to the selected events statistics and generate alarms therefrom.

In another embodiment, a log management system 370 is configured with a log manager 371 that receives log messages from a database 373. In this regard, the log manager 371 may include a database log adapter 372 that processes log messages of the database 373 transferred through a database protocol. The database log adapter 372 may be configured to process various types of database protocols to provide a sort of generic capability such that the log manager 371 may communicate with a variety of different database types. For example, the database log adapter 372 may be configured to communicate using ODBC (Open Database Connectivity), JDBC (Java Database Connectivity), ADO (Active-X Data Objects) etc. The database log adapter 372 may, therefore, communicate with a variety of databases to retrieve and collect logs of those databases. Examples of such database logs include Oracle audit logs, DB2 system logs, SAP application logs, SAP general ledger logs. Generally, the user will specify how to connect to the database 373 to begin collection of logs contained therein. Examples of parameters that may be used to establish an authenticated/secure session with the database 373 include the database type (e.g., Oracle, SQL Server, DB2, MySQL, Other, etc.), database server ip address, database name, login, password, encryption key (e.g., the digital signature as described hereinabove). Additionally, the user may specify log collection parameters used to govern how and when logs are collected. Examples of such include the maximum number of logs to collect and transmit in a single batch, maximum logs to collect per minute, start and end log collection times (only collect between 5:00 PM EST and 6:00 AM EST), and whether logs should be deleted from the source database after collection.

The operation of the database log adapter 372 generally includes communicatively connecting to the database 373 and determining previously recorded or user specified state information to ascertain whether any first log message should be queried. Then, the database log adapter 372 may use a log entry query statement combined with previously acquired state information to collect a next batch of log messages that should be collected. If no state information exists, the database log adapter 372 may return the first available log message and convert the log message into its text log representation. The database log adapter 372 may then forward the text log along with other information to message processing engine of the log manager 371 (e.g., MPE 54 of FIG. 3). Additionally, the database log adapter 372 may update state information and check configuration parameters to determine whether the database log adapter should continue collecting log messages.

While the database log adapter 372 may be configured to communicate directly with the database 373, a log agent (e.g., log agent 50 of FIG. 3) may be configured with the database 373 or even a remote server that communicates with the database 373 to transfer log messages (i.e., via database protocols) to the log manager 371. As with other embodiments described hereinabove, the log messages transferred via the database protocol may be encrypted by the log agent.

The database log adapter 372 may allow a user to identify log messages that are to be collected. Additionally, the database log adapter 372 may allow the user to record the date/time in which the log messages are detected. In one embodiment, the date/time is implemented relative to other log entries. That is, each log message may have a date/time stamp with subsequent log messages having incremental date/time stamps. Additionally, the database log adapter 372 may be able to track previous log messages and determine which log message is next in series. Such may be useful in "persisting" state information regarding the collection of log messages.

Generally, any user can specify how each log message row is to be formatted. The formatting may determine how each field in a log message may be used to create a single text log entry. When formatting the log message, the user will generally specify which fields of the log message should be included when preparing the text log, the order in which each field should appear in the text log, and, for each used field, any text based characters that should precede or follow the field when preparing the text log.

Certain elements have been described herein as having specific functions and being associated with particular reference numbers. For example, the log managers described herein have been referenced at different points in the text as the log manager 13, the log manager 31, the log managers 51-53, log manager 203, etc. These descriptions with varying reference numbers are merely intended to assist the reader in understanding various aspects of certain elements. It is not intended to limit any aspect of the invention to a particular embodiment. Rather, any element described herein may possess one or more features of another similarly named element. For example, the log manager 13 described in FIG. 1 may possess any of the capabilities of the log managers described herein (e.g., the log managers 31, 51-53, and 203).

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

APPENDIX A

Parse Tag Definitions

| Tag | Default Regular Expression Code | Function |
|---|---|---|
| sip | (?<sipa>1??\d{1,2}\| 2 [0-4] \d \| 25 [0-5]) \.<br>(?<sipb>1??\d{1,2}\| 2 [0-4] \d \| 25 [0-5]) \.<br>(?<sipc>1??\d{1,2}\| 2 [0-4] \d \| 25 [0-5]) \.<br>(?<sipd>1??\d{1,2}\| 2 [0-4] \d \| 25 [0-5]) | Report field: Source IP Address Parses source IP address into the 4 source IP fields representing the four octets a, b, c, and d. This is the most common tag to use when parsing the SIP.<br>NOTE: for both sip and dip tag, the regular expression must describe the character immediately following the last digit of the 4'th octet or 3 digit octets (e.g., 245) get truncated to 2 digit octets (e.g., 24). If tag is end of line than specify the end of line character ($). |
| sipa | 1??\d{1,2} \| 2 [0-4]\d \|25[0-5] | Report Field: Source IP Address Octet A Parses the first octet of the source IP address. |
| sipb | 1??\d{1,2} \| 2 [0-4]\d \|25[0-5] | Report Field: Source IP Address Octet B Parses the second octet of the source IP address. |
| sipc | 1??\d{1,2} \| 2 [0-4]\d \| 25[0-5] | Report Field: Source IP Address Octet C Parses the third octet of the source IP address. |
| sipd | 1??\d{1,2} \| 2 [0-4]\d \| 25[0-5] | Report Field: Source IPAddress Octet D Parses the fourth octet of the source IP address. |
| dip | (?<dipa>1??\d{1,2} \| 2 [0-4] \d \| 25 [0-5]) \.<br>(?<dipb>1??\d{1,2} \| 2 [0-4] \d \| 25 [0-5]) \.<br>(?<dipc>1??\d{1,2} \| 2 [0-4] \d \| 25 [0-5]) \.<br>(?<dipd>1??\d{1,2} \| 2 [0-4] \d \| 25 [0-5]) \. | Report Field: Destination IP Address Parsesdestination IP address into the destination IP fields representing the four octets a, b, c, and d. This is the most common tag to use when parsing the DIP. |
| dipa | 1??\d{1,2} \| 2 [0-4] \d \| 25 [0-5] | Report Field: Destination IP Address Octet A<br>Parses the first octet of the destination IP address. |
| dipb | 1??\d{1,2} \| 2 [0-4] \d \| 25 [0-5] | Report Field: Destination IP Address Octet B<br>Parses the second octet of the destination IP address. |
| dipc | 1??\d{1,2} \| 2 [0-4] \d \| 25 [0-5] | Report Field: Destination IP Address Octet C<br>Parses the third octet of the destination IP address. |
| dipd | 1??\d{1,2} \| 2 [0-4]\d \| 25 [0-5] [^\d] \| $] | Report Field: Destination IP Address Octet D<br>Parses the fourth octet of the destination IP address. |
| sipn | (<sip> \| <sname>) | Report Field: Source IP OR Name Parses the value as either a name or an IP address.<br>NOTE: the <sipn> tag cannot have it's regex defined. If needing to define the regex, a regex in the same form as sipn should be used. That is, the regex will be either <sip> or <sname> where the pattern matching for each one or both are explicitly defined.<br>The following is invalid:<br>(?<sipn>.*)<br>The following are valid<br>(<sip>\| (?<sname>.*))<br>((?<sip>.*) \| (?<sname>.*))<br>((?<sip>.*) \|<sname>) |
| dipn | (<dip> \| <dname>) | Destination IP OR Name Parses the value as either a name or an IP address. |
| sname | ((^\s\.]+\.?)+ | Report Field: Source Name Parses the name of the of the message source |
| dname | ((^\s\.]+\.?)+ | Report Field: Destination Name Parses the name of the message destination |
| sport | \d+ | Report Field: Source Port Parses the source port number |

APPENDIX A-continued

Parse Tag Definitions

| Tag | Default Regular Expression Code | Function |
| --- | --- | --- |
| dport | \d+ | Report Field: Destination Port<br>Parses the destination port number. |
| protnum | 1??\d(1,2) \| 2 [0-4] \d \| 25 [0-5] | Report Field: Protocol Number<br>Parses the protocol based on the IANA protocol number (e.g., 6 = TCP, 17 = UDP, 1 = ICMP). |
| protname | \w+ | Report Field: Protocol Number<br>Parses the protocol based on the IANA keyword (e.g., tcp, icmp, udp, etc.) and converts to the appropriate protocol number. |

Log Data Tags

| Tag | Default Regular Expression Code | Function |
| --- | --- | --- |
| login | \w+ | Report Field: Login<br>Parses data representing the login |
| person | \w+ | Report Field: Person<br>Parses data representing a person, most often their name |
| action | \w+ | Report Field: Action<br>Parses data representing an action such as login, execute, write, read, etc. |
| result | \w+ | Report Field: Result<br>Parses data representing a result such as failed, success, error |
| program | \w+ | Report Field: Program<br>Parses data representing the name or ID of the specific program within an application |
| object | \w+ | Report Field: Object<br>ufParses data representing the object in the context of the log entry |
| uf1 | .* | Report Field: User Field 1<br>Parses data to be stored in User Field 1 (up to 50 characters) |
| uf2 | .* | Report Field: User Field 2<br>Parses data to be stored in User Field 2 (up to 50 characters) |
| uf3 | .* | Report Field: User Field 3<br>Parses data to be stored in User Field 3 (up to 100 characters) |
| ut4 | .* | Report Field: User Field 4<br>Parses data to be stored in User Field 4 (up to 255 characters) |
| uf5 | .* | Report Field: User Field 5<br>Parses data to be stored in User Field 5 (up to 255 characters) |

What is claimed is:

1. A method for use in monitoring one or more platforms of a data system, comprising the steps of:
    establishing, on a processing platform, a number of log processing rules for selectively processing logs based on a content of one or more data fields of the said logs, wherein log messages in different formats are generated by said one or more platforms and are collected using standard system logging and messaging protocols;
    identifying, using said processing platform, a log message associated with a monitored platform;
    first operating said processing platform to parse said log message into a number of data fields and determining a field content of at least one of said fields; and
    based on said field content, second using said processor to process said log message using said processing rules.

2. A method as set forth in claim 1, wherein said step of establishing comprises providing at least one rule governing archiving of log messages on a log content dependent basis.

3. A method as set forth in claim 1, wherein said step of establishing comprises providing at least one rule for distinguishing between first logs and second logs, wherein said first logs are prioritized for review.

4. A method as set forth in claim 3, wherein said first logs are designated as an event for further processing.

5. A method as set forth in claim 4, wherein said event relates to one of application monitoring, security, operations and auditing or regulatory compliance.

6. A method as set forth in claim 5, wherein said step of first operating comprises identifying data fields corresponding to one or more of a log host, a log message source, an IP address, a program and a login.

7. A method as set forth in claim 4, further comprising promoting said event to an alarm status.

8. A method as set forth in claim 7, further comprising communicating said alarm status of said event to a device upon the promotion of said event to said alarm status.

9. A method as set forth in claim 4, further comprising making the event available for viewing on a dashboard.

10. A method as set forth in claim 9, wherein said dashboard comprises at least one user interface.

11. A method as set forth in claim 10, wherein said event comprises at least one of said first logs and at least one normalized data field.

12. A method for use in monitoring one or more platforms of a data system, comprising the steps of:
 identifying, using a processing platform, a log message to be archived, wherein log messages in different formats are generated by said one or more platforms and are collected using standard system logging and messaging protocols;
 first operating said processing platform to associate metadata with each of multiple parsed portions of the said identified log message to be archived, wherein said metadata includes information to assist in restoring said message; and
 second operating said processing platform to archive said log message together with said metadata in a data structure for enabling restoration of said log message using said metadata.

13. A method for use in processing logs in a data system, comprising the steps of:
 providing a computer-based tool for use in accessing archived logs based on metadata describing each of multiple parsed portions of the logs, wherein log messages in different formats are generated by said one or more platforms and are collected using standard system logging and messaging protocols, wherein the multiple parsed portions comprise data fields corresponding to one or more of a log host, a log message source, an IP address, a program and a login;
 first operating said computer-based tool to receive restoration information associated with one or more fields of said metadata; and
 second operating said computer-based tool to restore one or more logs based on said received restoration information.

14. A method for use in monitoring one or more platforms of a data system, comprising the steps of:
 establishing an agent protocol defining communications between an agent for acquiring log messages and a processor for processing log messages, wherein log messages in different formats are generated by said one or more platforms and are collected using standard system logging and messaging protocols;
 providing an agent for monitoring log messages associated with a monitored platform; and
 operating said agent to identify a log message of interest, process said log message to parse said message and associate metadata with parsed portions of said message, and provide an output in accordance with said agent protocol, wherein said output includes substantially an entirety of a content of said message together with said metadata.

15. A method for use in monitoring one or more platforms of a data system, comprising the steps of:
 establishing an agent protocol defining communications between an agent for acquiring log messages and a processor for processing log messages, wherein log messages in different formats are generated by said one or more platforms and are collected using standard system logging and messaging protocols;
 receiving, at said processor, a pre-processed log message in accordance with said protocol, where said pre-processed log message includes parsed portions of a raw log message, collectively including substantially an entirety of a content of said raw message, together with metadata defining said parsed portions; and
 operating said processor to use said metadata to further process said preprocessed log message.

16. A method for use in processing textual messages in a data system, comprising the steps of:
 first using a processor to establish a tagging notation in relation to a subject matter area of a textual message, said tagging notation including a metadata model for describing parsed portions of said textual message, wherein textual messages in different formats are generated by said one or more platforms and are collected using standard system logging and messaging protocols; and
 second using said processor to establish rules operative for converting said tagging notation into regular expression notation, wherein said tagging notation includes at least a first tag and a second tag wherein said first tag is operative for identifying a parsed portion of said textual message and said second tag is operative to identify a sub rule, wherein said sub rule further defines one of said rules.

17. A method for use in monitoring one or more platforms in a data system, comprising the steps of:
 first operating a processing platform to access a Windows event log from a monitored platform; wherein event logs in different formats are generated by said one or more platforms and are collected using standard system logging and messaging protocols;
 second operating said processing platform to identify a timestamp associated with the Windows event log; and
 third operating said processing platform to normalize the timestamp such that the time stamp is substantially independent of a processing environment of the monitored platform; wherein said step of third operating comprises accounting for one of a local time zone, a local clock offset, and a local platform time system.

* * * * *